(12) United States Patent
Inoue et al.

(10) Patent No.: US 9,505,409 B2
(45) Date of Patent: Nov. 29, 2016

(54) VEHICLE ACCELERATION SUPPRESSION DEVICE

(71) Applicant: NISSAN MOTOR CO., LTD., Yokohama-shi, Kanagawa (JP)

(72) Inventors: Takuya Inoue, Kawasaki (JP); Takeshi Sugano, Yokohama (JP); Toshimichi Gokan, Machida (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 48 days.

(21) Appl. No.: 14/442,232

(22) PCT Filed: Oct. 28, 2013

(86) PCT No.: PCT/JP2013/006356
§ 371 (c)(1),
(2) Date: May 12, 2015

(87) PCT Pub. No.: WO2014/083762
PCT Pub. Date: Jun. 5, 2014

(65) Prior Publication Data
US 2016/0288794 A1 Oct. 6, 2016

(30) Foreign Application Priority Data

Nov. 27, 2012 (JP) .................................. 2012-259187

(51) Int. Cl.
*B60T 7/22* (2006.01)
*B60W 30/18* (2012.01)
*G01S 19/42* (2010.01)

(52) U.S. Cl.
CPC .... *B60W 30/18009* (2013.01); *B60W 2420/42* (2013.01); *B60W 2520/28* (2013.01); *B60W2540/10* (2013.01); *B60W 2540/12* (2013.01); *B60W 2540/16* (2013.01); *B60W 2540/18* (2013.01); *B60W 2710/0605* (2013.01); *G01S 19/42* (2013.01)

(58) Field of Classification Search
CPC ...... B60K 31/00; B60K 31/10; B60W 28/16
USPC .......... 701/51, 65, 93, 94, 95; 180/170, 179, 180/197
See application file for complete search history.

(56) References Cited

U.S. PATENT DOCUMENTS 7,894,971 B2 * 2/2011 Inoue .............. B60W 30/18027
123/350
8,150,593 B2 * 4/2012 Taki .......................... B60T 7/22
340/435

(Continued)

FOREIGN PATENT DOCUMENTS

DE    102010045021 A1    3/2011
JP    2006195623 A    7/2006

(Continued)

*Primary Examiner* — Thomas G Black
*Assistant Examiner* — Wae Louie
(74) *Attorney, Agent, or Firm* — Young Basile Hanlon & MacFarlane, P.C.

(57) ABSTRACT

A travel controller carries out acceleration suppression control of suppressing acceleration of a vehicle depending on an accelerator manipulation amount based on a parking frame existing ahead in a driven direction of the vehicle. Then, the travel controller is configured to gradually release the acceleration suppression control when detecting that the vehicle is in a stop state while carrying out the acceleration suppression control. In addition, the travel controller is configured to hold a release state of the acceleration suppression control at the time of detection of the travel state, when the travel state detector detects that the vehicle is in a travel state while releasing the acceleration suppression control.

5 Claims, 9 Drawing Sheets

(56) References Cited

U.S. PATENT DOCUMENTS

| | | | |
|---|---|---|---|
| 8,751,125 B2* | 6/2014 | Ozaki | B60T 7/042 701/110 |
| 2007/0061059 A1* | 3/2007 | Inoue | B60W 10/06 701/41 |
| 2007/0150158 A1* | 6/2007 | Inoue | B60W 30/18027 701/93 |
| 2009/0234526 A1* | 9/2009 | Taki | B60T 7/22 701/23 |
| 2011/0066342 A1* | 3/2011 | Ozaki | B60T 7/042 701/70 |

FOREIGN PATENT DOCUMENTS

| | | |
|---|---|---|
| JP | 2007077871 A | 3/2007 |
| JP | 2007315284 A | 12/2007 |
| JP | 2008143337 A | 6/2008 |
| JP | 2011063122 A | 3/2011 |
| WO | 2012095716 A1 | 7/2012 |

\* cited by examiner

FIG. 11A
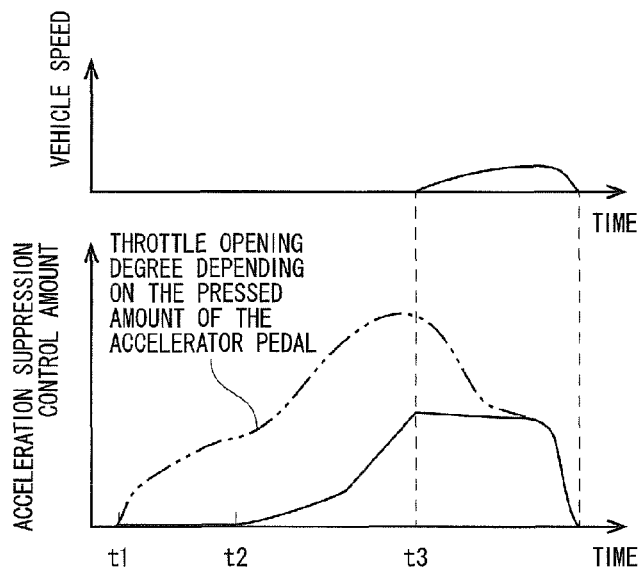
FIG. 11B
FIG. 12
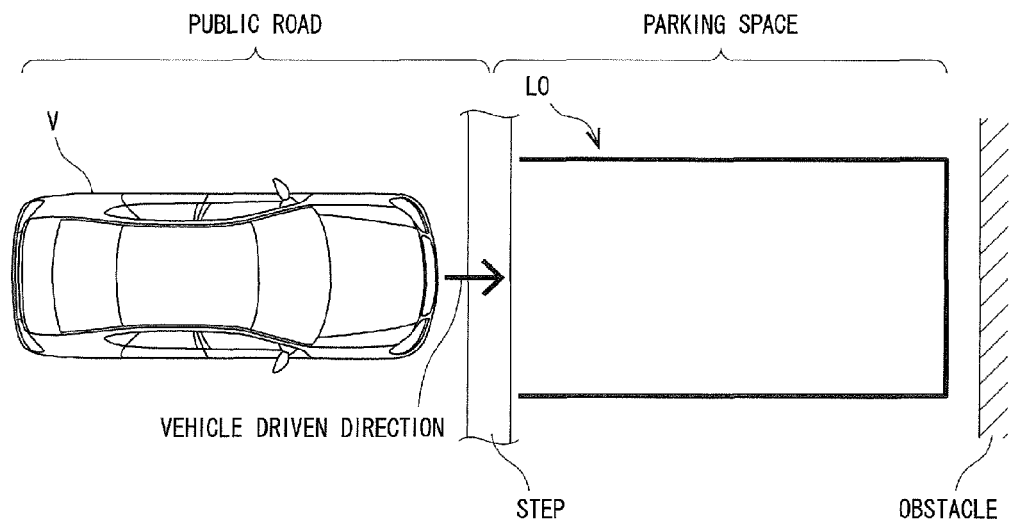

VEHICLE ACCELERATION SUPPRESSION DEVICE

CROSS REFERENCE TO RELATED APPLICATION

The present application claims priority to Japanese Patent Application No. 2012-259187, filed Nov. 27, 2012, incorporated herein in its entirety.

TECHNICAL FIELD

The present disclosure relates to a vehicle acceleration suppression device configured to carry out acceleration suppression control.

BACKGROUND

In one technology, as a type of this technique, the technique disclosed in, for example, JP 2007-315284 A, is known.

In such a technology, in moving over a step, the drive force is adjusted to be increased when the vehicle speed decreases. Hence, in such a technology, it is made possible to shorten the stop period of the vehicle and move over a step speedily.

In the above-described one technology, however, in moving over the step, the drive force is adjusted to be increased when the vehicle speed decreases. Thus, interference might occur, if there is an obstacle immediately after the vehicle moves over the step.

SUMMARY

The present disclosure has been made in view of the above circumstances, and has an object to enable the vehicle to move over a step more appropriately, even if there is an obstacle immediately after the vehicle moves over the step.

In order to address the above issue, in one embodiment of the present disclosure, acceleration suppression control of suppressing acceleration of the vehicle which depends on a manipulation amount of an acceleration manipulation unit based on the at least one of the parking frame or the obstacle existing ahead in a driven direction of the vehicle. In addition, in one embodiment of the present disclosure, the acceleration suppression control is gradually released, when it is detected that the vehicle is in a stop state while the acceleration suppression control is being carried out, and a release state of the acceleration suppression control at the time when a travel state of the vehicle is detected is held, when it is detected that the vehicle is in the travel state while the acceleration suppression control is being released.

In one embodiment of the present disclosure, it is made possible for a vehicle to move over a step more appropriately, even when there is an obstacle immediately after the vehicle moves over the step.

BRIEF DESCRIPTION OF THE DRAWINGS

FIG. 11A and FIG. 11B are views illustrative of an operation of the vehicle acceleration suppression device 1; and FIG. 12 is a view illustrative of an operation of the vehicle acceleration suppression device 1.

DETAILED DESCRIPTION OF THE EMBODIMENTS

Hereinafter, embodiments of the present disclosure (hereinafter, also referred to as the present embodiment) will be described with reference to the drawings.

(Configuration)

Figure 1:
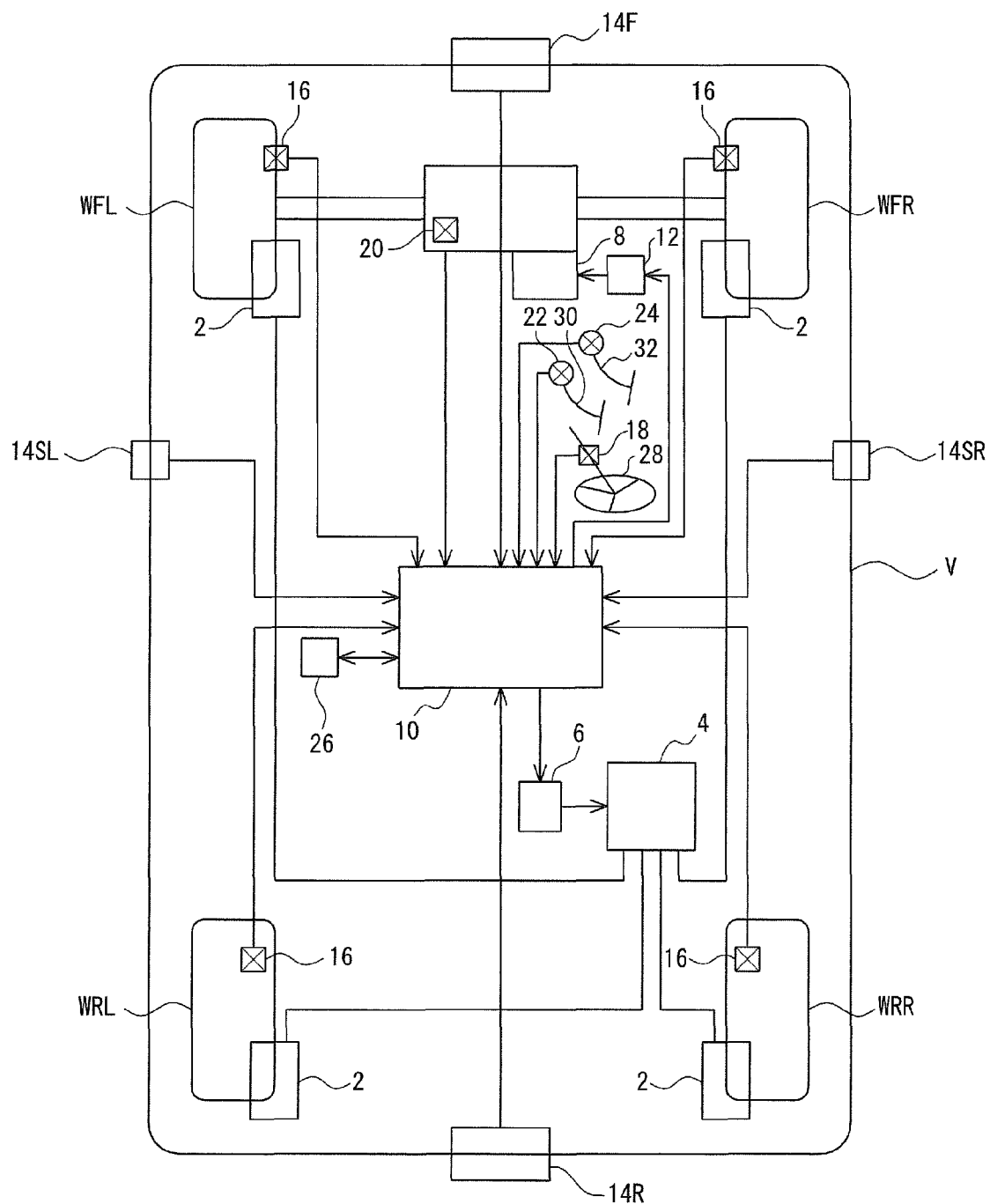
FIG. 1 is a conceptual view illustrative of a configuration of a vehicle V including a vehicle acceleration suppression device 1.

Firstly, by using FIG. 1, a configuration of a vehicle V including a vehicle acceleration suppression device 1 in the present embodiment will be described. FIG. 1 is a conceptual view illustrative of the configuration of the vehicle V including the vehicle acceleration suppression device 1.

As illustrated in FIG. 1, the vehicle V includes wheels W (i.e., front right wheel WFR, front left wheel WFL, rear right wheel WRR, and rear left wheel WRL), a brake device 2, a fluid pressure circuit 4, and a brake controller 6. In addition to this, the vehicle V includes an engine 8 and an engine controller 12.

For example, the brake device 2 is configured with a wheel cylinder, for example, and is provided for each wheel W. It is to be noted that the brake device 2 is not limited to a device of applying a brake force by a fluid pressure, and may be configured with an electric brake device or the like.

The fluid pressure circuit 4 is a circuit configured to include piping connected to each brake device 2. The brake controller 6 is configured to control the brake force generated at each brake device 2 to a value corresponding to a brake force instruction value via the fluid pressure circuit 4, based on a brake force instruction value that has been received from a travel controller 10 which is a higher controller. In other words, the brake controller 6 configures a deceleration controller. It is to be noted that the travel controller 10 will be described later.

Thus, the brake device 2, the fluid pressure circuit 4, and the brake controller 6 configure a brake device of generating a brake force.

The engine 8 configures a drive source of the vehicle V. It is to be noted that the drive source of the vehicle V is not limited to the engine 8, and may be configured with an electric motor. Also, the drive source of the vehicle V may be configured by combining the engine 8 with an electric motor.

The engine controller 12 controls torque (drive force) generated at the engine 8, based on a target throttle opening degree signal (acceleration instruction value) that have been received from the travel controller 10. In other words, the engine controller 12 configures an acceleration control unit. It is to be noted that the target throttle opening degree signal will be described later. Thus, the engine 8 and the engine controller 12 configure a drive unit of producing a drive force.

Figure 2:
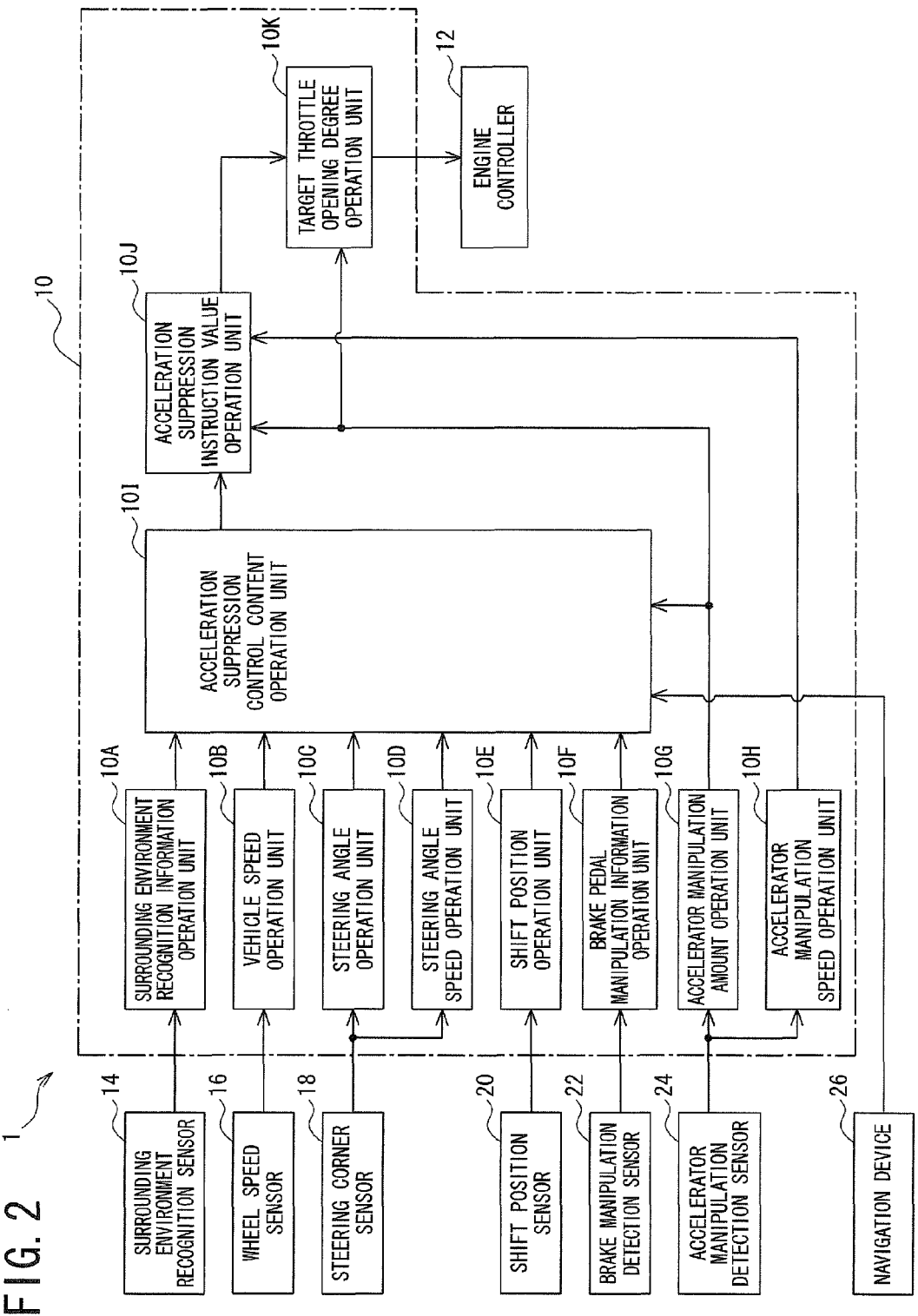
FIG. 2 is a block view illustrative of an outline configuration of the vehicle acceleration suppression device 1.

Next, referring to FIG. 1, by using FIG. 2, an outline configuration of the vehicle acceleration suppression device 1 will be described. FIG. 2 is a block view illustrative of the outline configuration of the vehicle acceleration suppression device 1 in the present embodiment.

The vehicle acceleration suppression device 1 is configured to include, as illustrated in FIG. 1 and FIG. 2, a surrounding environment recognition sensor 14, a wheel speed sensor 16, a steering angle sensor 18, a shift position sensor 20, a brake manipulation detection sensor 22, and an accelerator manipulation detection sensor 24. The vehicle acceleration suppression device 1 further includes a navigation device 26 and a travel controller 10.

The surrounding environment recognition sensor 14 is configured to capture an image of surroundings of the vehicle V, and to generate an information signal (hereinafter, also referred to as "individual image signal") including individual images corresponding to plural imaging directions based on each image that has been captured. Then, the surrounding environment recognition sensor 14 is configured to output the generated individual image signal is output to the travel controller 10. It is to be noted that in the present embodiment, as an example, a description will be given of a case where the surrounding environment recognition sensor 14 is configured with a front camera 14F, a right side camera 14SR, a left side camera 14SL, and a rear camera 14R. Herein, the front camera 14F is a camera configured to capture a front side image of the vehicle V in front-rear direction of the vehicle V, and the right side camera 14SR is a camera configured to capture a right side image of the vehicle V. Also, the left side camera 14SL is a camera configured to capture a left side image of the vehicle V, and a rear camera 14R is a camera configured to capture a rear side image of the vehicle V in the front-rear direction of the vehicle V.

The wheel speed sensor 16 is configured with a pulse generator or the like, for example, a rotary encoder of measuring a wheel speed pulse, and is arranged at each wheel W. In addition, the wheel speed sensor 16 is configured to detect a rotation speed of each wheel W, and to output an information signal (hereinafter, also referred to as "wheel speed signal") including such a detected rotation speed to the travel controller 10.

For example, the steering angle sensor 18 is arranged at a steering column (not illustrated) for rotatably supporting a steering wheel 28. Further, the steering angle sensor 18 is configured to detect a current steering angle that is a current rotation angle (steering manipulation amount) of the steering wheel 28 that is a steering manipulation unit, and to output the information signal (hereinafter, also referred to as "current steering angle signal") including the detected current rotation angle to the travel controller 10. It is to be noted that the information signal including the turning angle of a turning wheel may be detected as information indicative of a steering angle. It is to be noted that the steering manipulation element is not limited to the steering wheel 28 to be steered by a driver. For example, it may be a lever manipulated by a driver's hand. In this case, the angle of inclination of the lever from a neutral position is output as the information signal corresponding to the current steering angle signal.

The shift position sensor 20 is configured to detect a current position of a member, such as a shift knob, a shift lever, or the like, for changing the shift position (for example, "P", "D", "R" or the like) of the vehicle V. Then, the shift position sensor 20 is configured to output the information signal (hereinafter, also referred to as "shift position signal") including the detected current position to the travel controller 10.

The brake manipulation detection sensor 22 is configured to detect an opening degree of a brake pedal 30, which is a brake force instruction manipulation unit. Then, brake manipulation detection sensor 22 is configured to output the information signal (hereinafter, also referred to as "brake opening degree signal") including the opening degree of the brake pedal 30 that has been detected to the travel controller 10. Herein, the brake force instruction manipulation unit can be manipulated by a driver of the vehicle V, and is a configuration to instruct a brake force of the vehicle V by a change in the opening degree. It is to be noted that the brake force instruction manipulation unit is not limited to the brake pedal 30 to be pressed for manipulation by a driver with a foot. For example, it may be a lever manipulated by a driver's hand.

The accelerator manipulation detection sensor 24 is configured to detect the opening degree of an accelerator pedal 32, which is a drive force instruction manipulation unit. Then, the accelerator manipulation detection sensor 24 is configured to output the information signal (hereinafter, also referred to as "accelerator opening degree signal") including the detected opening degree of the accelerator pedal 32 to the travel controller 10. Herein, the drive force instruction manipulation unit can be manipulated by a driver of the vehicle V, and is a configuration indicative of a drive force of the vehicle V by a change in the opening degree. It is to be noted that the drive force instruction manipulation unit is not limited to the accelerator pedal 32 to be pressed for manipulation by a driver with a foot. For example, it may be a lever manipulated by a driver's hand.

The navigation device 26 includes a GPS (Global Positioning System) receiver, a map database, and an information presentation device including a display monitor and the like, and is a device configured to perform a route search, a route guidance, and the like. In addition, the navigation device 26 is capable of acquiring road information such as a type of a road, a width of the road, and the like of the road on which the vehicle V travels, based on the current location of the vehicle V acquired by using the GPS receiver and the road information stored in the map database. Further, the navigation device 26 is configured to output the information signal (hereinafter, also referred to as "vehicle location signal") including the current location of the vehicle V acquired by using the GPS receiver to the travel controller 10. In addition to this, the navigation device 26 is configured to output the information signal (hereinafter, also referred to as "travel road information signal") including the type of the road, the width of the road, and the like of the road on which the vehicle V travels to the travel controller 10. The information presentation device is configured to output a warning or another presentation in a sound or image in response to a control signal from the travel controller 10. In addition, the information presentation device is configured to include for example, a speaker to provide information to a driver in a buzzer or voice, and a display unit to provide information by presenting an image or text. Further, for example, a display monitor of the navigation device 26 may be used for the display unit.

The travel controller 10 is an electronic control unit configured with a CPU (Central Processing Unit), and CPU peripheral devices such as a ROM (Read Only Memory), a RAM (Random Access Memory), and the like. In addition, the travel controller 10 includes a parking drive assist unit configured to carry out a drive assist process for parking. The parking drive assist unit of the process of the travel controller 10 is configured to functionally include, as illustrated in FIG. 2, processes of a surrounding environment recognition information operation unit 10A, a vehicle speed operation unit 10B, a steering angle operation unit 10C, and a steering angle speed operation unit 10D. In addition, the parking drive assist unit is configured to functionally include processes of a shift position operation unit 10E, a brake pedal manipulation information operation unit 10F, an accelerator manipulation amount operation unit 10G, an accelerator manipulation speed operation unit 10H, and an acceleration suppression control content operation unit 10I. Further, the parking drive assist unit is configured to functionally include processes of an acceleration suppression instruction value operation unit 10J, and a target throttle opening degree operation unit 10K. These functions are configured with one or more programs.

The surrounding environment recognition information operation unit 10A is configured to create an image (bird's-eye view image) of surroundings of the vehicle V viewed from above the vehicle V based on the individual image signal which has been received from the surrounding environment recognition sensor 14. Then, surrounding environment recognition information operation unit 10A is configured to output an information signal (hereinafter, also referred to as "bird's-eye view image signal") including the bird's-eye view image that has been created to the acceleration suppression control content operation unit 10I. Herein, the bird's-eye view image, for example, is created by synthesizing the images captured by the respective cameras (the front camera 14F, the right side camera 14SR, the left side camera 14SL, and the rear camera 14R). In addition, a bird's-eye view image includes, for example, an image indicative of a road marking such as a line (hereinafter, also referred to as "parking frame line") of a parking frame displayed on a road surface.

The vehicle speed operation unit 10B is configured to operate the speed (vehicle speed) of the vehicle V from the rotation speed of the wheel W based on the wheel speed signal which has been received from the wheel speed sensor 16. Then, the vehicle speed operation unit 10B is configured to output an information signal (hereinafter also referred to as "vehicle speed operation value signal") including the speed that has been operated to the acceleration suppression control content operation unit 10I.

The steering angle operation unit 10C is configured to operate the manipulation amount (rotation angle) from the neutral position of the steering wheel 28 based on the current steering angle signal which has been received from the steering angle sensor 18 from the current rotation angle of the steering wheel 28. Then, an information signal (hereinafter, also referred to as "steering angle signal") including the manipulation amount from the neutral position which has been operated is output to the acceleration suppression control content operation unit 10I.

The steering angle speed operation unit 10D is configured to carry out a differential process on the current steering angle included in the steering angle signal that has been received from the steering angle sensor 18, and to operate the steering angle speed of the steering wheel 28. Then, the steering angle speed operation unit 10D is configured to output an information signal (hereinafter, also referred to as "steering angle speed signal") including the steering angle speed that has been operated to the acceleration suppression control content operation unit 10I.

The shift position operation unit 10E is configured to determine the current shift position based on the shift position signal that has been received from the shift position sensor 20. Then, the shift position operation unit 10E is configured to output an information signal (hereinafter, also referred to as "current shift position signal") including the current shift position that has been operated to the acceleration suppression control content operation unit 10I.

The brake pedal manipulation information operation unit 10F is configured to operate the pressed amount of the brake pedal 30 with a pressed amount "0" being used as a reference, based on the brake opening degree signal which has been received from the brake manipulation detection sensor 22. Then, the brake pedal manipulation information operation unit 10F is configured to output an information signal (hereinafter, also referred to as "brake side pressed amount signal") including the pressed amount of the brake pedal 30 that has been operated to the acceleration suppression control content operation unit 10I.

The accelerator manipulation amount operation unit 10G is configured to operate the pressed amount of the accelerator pedal 32 with a pressed amount "0" being used as a reference, based on the accelerator opening degree signal which has been received from the accelerator manipulation detection sensor 24. Then, the accelerator manipulation amount operation unit 10G is configured to output an information signal (hereinafter, also referred to as "drive side pressed amount signal") including the pressed amount of the accelerator pedal 32 that has been operated to the acceleration suppression control content operation unit 10I, the acceleration suppression instruction value operation unit 10J, and the target throttle opening degree operation unit 10K.

The accelerator manipulation speed operation unit 10H is configured to operate the manipulation speed of the accelerator pedal 32, by carrying out the differential process on the opening degree of the accelerator pedal 32 included in the accelerator opening degree signal which has been received from the accelerator manipulation detection sensor 24. Then, the accelerator manipulation speed operation unit 10H is configured to output an information signal (hereinafter, also referred to as "accelerator manipulation speed signal") including the manipulation speed of the accelerator pedal 32 that has been operated to the acceleration suppression instruction value operation unit 10J.

The acceleration suppression control content operation unit 10I is configured to receive above-described various information signals (including an bird's-eye view image signal, a vehicle speed operation value signal, a steering angle signal, a steering angle speed signal, a current shift position signal, a brake side pressed amount signal, a drive side pressed amount signal, a vehicle location signal, and a travel road information signal). Then, the acceleration suppression control content operation unit 10I is configured to operate an acceleration suppression activation condition determination result, an acceleration suppression control start timing, and an acceleration suppression control amount, as will be described later, based on the various information signals that have been received. Further, the acceleration suppression control content operation unit 10I is configured to output the information signal including such operated parameters to the acceleration suppression instruction value operation unit 10J. It is to be noted that a detailed configuration of the acceleration suppression control content operation unit 10I and the process to be carried out by the acceleration suppression control content operation unit 10I will be described later.

The acceleration suppression instruction value operation unit 10J is configured to receive inputs of the above-described drive side pressed amount signal and the accelerator manipulation speed signal, and inputs of an acceleration suppression activation condition determination result signal, an acceleration suppression control start timing signal, and an acceleration suppression control amount signal, as will be described later. Then, the acceleration suppression instruction value operation unit 10J is configured to operate the acceleration suppression instruction value that is an instruction value for suppressing the acceleration instruction value which depends on the pressed amount (drive force manipulation amount) of the accelerator pedal 32. Further, the acceleration suppression instruction value operation unit 10J is configured to output an information signal (hereinafter, also referred to as "acceleration suppression instruction value signal") including the acceleration suppression instruction value that has been operated to the target throttle opening degree operation unit 10K. In addition, the acceleration suppression instruction value operation unit 10J is configured to operate an ordinary acceleration instruction value that is an instruction value for use in ordinary acceleration control depending on the acceleration suppression activation condition determination result signal that has been received. Further, the acceleration suppression instruction value operation unit 10J is configured to output an information signal (hereinafter, also referred to as "ordinary acceleration instruction value signal") including the ordinary acceleration instruction value that has been operated to the target throttle opening degree operation unit 10K. It is to be noted that the process to be carried out by the acceleration suppression instruction value operation unit 10J will be described later.

The target throttle opening degree operation unit 10K is configured to receive inputs of the drive side pressed amount signal, and the acceleration suppression instruction value signal or the ordinary suppression instruction value signal. Then, the target throttle opening degree operation unit 10K is configured to operate the target throttle opening degree that is the throttle opening degree depending on the pressed amount of the accelerator pedal 32 or the ordinary acceleration instruction value, based on the pressed amount of the accelerator pedal 32, and the acceleration suppression instruction value or the ordinary acceleration suppression instruction value. Further, the target throttle opening degree operation unit 10K is configured to output an information signal (hereinafter, also referred to as "target throttle opening degree signal") including the target throttle opening degree that has been operated to the engine controller 12. It is to be noted that the process to be carried out by the target throttle opening degree operation unit 10K will be described later.

(Configuration of Acceleration Suppression Control Content Operation Unit 10I)

Figure 3:
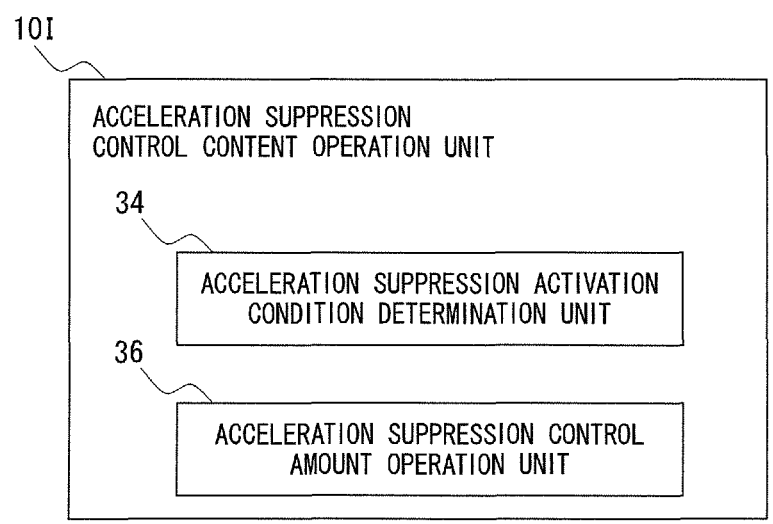
FIG. 3 is a block view illustrative of a configuration of an acceleration suppression control content operation unit 10I.

Next, referring to FIG. 1 and FIG. 2, by using FIG. 3, a detailed configuration of the acceleration suppression control content operation unit 10I will be described. FIG. 3 is a block view illustrative of a configuration of the acceleration suppression control content operation unit 10I.

As illustrated in FIG. 3, the acceleration suppression control content operation unit 10I is configured to include an acceleration suppression activation condition determination unit 34 and an acceleration suppression control amount operation unit 36.

The acceleration suppression activation condition determination unit 34 is configured to determine whether or not a condition to activate acceleration suppression control is satisfied, and to output an information signal (hereinafter, also referred to as "acceleration suppression activation condition determination result signal") including the determination result to the acceleration suppression instruction value operation unit 10J. Herein, the acceleration suppression control is control to suppress an acceleration instruction value for accelerating the vehicle V depending on the pressed amount of the accelerator pedal 32.

It is to be noted that a description will be given later of the process of determining whether or not the condition that the acceleration suppression activation condition determination unit 34 activates the acceleration suppression control is satisfied.

The acceleration suppression control amount operation unit 36 is configured to operate the acceleration suppression control amount that is a control amount to suppress the acceleration instruction value which depends on the pressed amount of the accelerator pedal 32. Then, the acceleration suppression control amount operation unit 36 is configured to output an information signal (hereinafter, also referred to as "acceleration suppression control amount signal") including the acceleration suppression control amount that has been operated to the acceleration suppression instruction value operation unit 10J.

It is to be noted the process of operating the acceleration suppression control amount by the acceleration suppression control amount operation unit 36 will be described later.

(Process to be Carried Out by the Acceleration Suppression Control Content Operation Unit 10I)

Next, referring to FIG. 1 to FIG. 3, by using FIG. 4 to FIG. 7, the process to be carried out by the acceleration suppression control content operation unit 10I will be described.

Referring to FIG. 1 to FIG. 3, by using FIG. 4 and FIG. 5, a process of determining whether or not a condition (hereinafter, also referred to as "acceleration suppression activation condition") that the acceleration suppression activation condition determination unit 34 activates the acceleration suppression control will be described.

Figure 4:
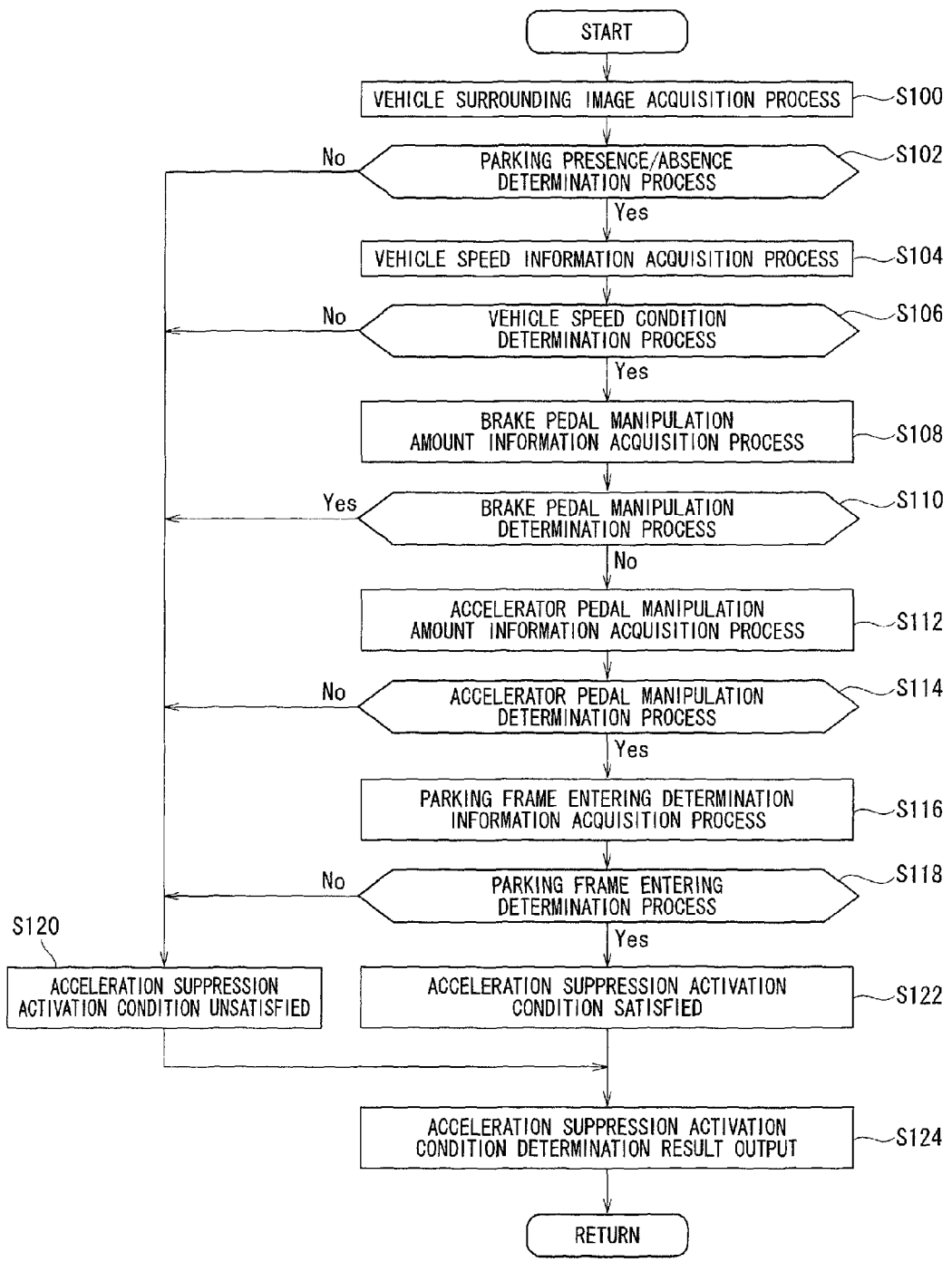
FIG. 4 is a flowchart illustrative of a process of determining whether or not an acceleration suppression activation condition is satisfied by an acceleration suppression activation condition determination unit 34.

FIG. 4 is a flowchart illustrative of the process of determining whether or not the acceleration suppression activation condition is satisfied, by the acceleration suppression activation condition determination unit 34. It is to be noted that the acceleration suppression activation condition determination unit 34 is configured to carry out the process to be described below at every predefined sampling time (for example, 10 msec).

As illustrated in FIG. 4, when the acceleration suppression activation condition determination unit 34 starts (START), firstly, in step S100, a process ("vehicle surrounding image acquisition process" in the drawing) of acquiring an image of surroundings of the vehicle V. The acceleration suppression activation condition determination unit 34 carried out the process of acquiring an image of surroundings of the vehicle V in step S100, and then the process to be carried out by the acceleration suppression activation condition determination unit 34 goes to step S102. It is to be noted that the image of surroundings of the vehicle V is acquired by referring to the bird's-eye view image of surroundings of the vehicle V included in the bird's-eye view image signal which has been received from the surrounding environment recognition information operation unit 10A.

In step S102, based on the image acquired in step S100, the acceleration suppression activation condition determination unit 34 carries out a process ("parking presence/absence determination process" in the drawing) of determining the presence or absence of the parking frame. Herein, the process of determining the presence or absence of the parking frame is carried out by determining whether or not a white line (parking frame line) of defining the parking frame is present, for example, within a predefined distance or region (area) with the vehicle V being used as a reference. In addition, for the process of recognizing a parking frame line from the image acquired in step S100, various types of publicly known methods, for example, a banalization process and the like are used. When the acceleration suppression activation condition determination unit 34 determines the presence of the parking frame ("Yes" in the drawing) in step S102, the process to be carried out by the acceleration suppression activation condition determination unit 34 goes to step S104. On the other hand, when the acceleration suppression activation condition determination unit 34 determines the absence of the parking frame ("No" in the drawing) in step S102, the process to be carried out by the acceleration suppression activation condition determination unit 34 goes to step S120.

In step S104, by referring to the vehicle speed operation value signal that has been received from the vehicle speed operation unit 10B, the acceleration suppression activation condition determination unit 34 carried out the process of acquiring the speed of the vehicle V ("vehicle speed information acquisition process" in the drawing). The acceleration suppression activation condition determination unit 34 carries out the process of acquiring the speed of the vehicle V in step S104, and then the process to be carried out by the acceleration suppression activation condition determination unit 34 goes to step S106.

In step S106, based on the vehicle speed acquired in step S104, the acceleration suppression activation condition determination unit 34 carries out a process ("vehicle speed condition determination process" in the drawing) of determining whether or not the condition that the speed of the vehicle V is lower than a predefined threshold vehicle speed is satisfied. It is to be noted that in the present embodiment, a case where the threshold vehicle speed is set to 15 km/h, as an example, will be described. When the acceleration suppression activation condition determination unit 34 determines that the condition that the speed of the vehicle V is lower than the threshold vehicle speed is satisfied ("Yes" in the drawing) in step S106, the process to be carried out by the acceleration suppression activation condition determination unit 34 goes to step S108. On the other hand, when the acceleration suppression activation condition determination unit 34 determines that the condition that the speed of the vehicle V is lower than the threshold vehicle speed is not satisfied ("No" in the drawing) in step S106, the process to be carried out by the acceleration suppression activation condition determination unit 34 goes to step S120.

In step S108, by referring to the brake side pressed amount signal that has been received from the brake pedal manipulation information operation unit 10F, the acceleration suppression activation condition determination unit 34 carries out a process of acquiring information about the pressed amount (manipulation amount) of the brake pedal 30 ("brake pedal manipulation amount information acquisition process" in the drawing). The acceleration suppression activation condition determination unit 34 carries out the process of acquiring the information about the pressed amount (manipulation amount) of the brake pedal 30 in step S108, and then the process to be carried out by the acceleration suppression activation condition determination unit 34 goes to step S110.

In step S110, based on the pressed amount of the brake pedal 30 acquired in step S108, the acceleration suppression activation condition determination unit 34 carries out a process ("brake pedal manipulation determination process" in the drawing) of determining whether or not the brake pedal 30 is manipulated. When the acceleration suppression activation condition determination unit 34 determines that the brake pedal 30 is not manipulated ("No" in the drawing) in step S110, the process to be carried out by the acceleration suppression activation condition determination unit 34 goes to step S112. On the other hand, when the acceleration suppression activation condition determination unit 34 determines that the brake pedal 30 is manipulated ("Yes" in the drawing) in step S110, the process to be carried out by the acceleration suppression activation condition determination unit 34 goes to step S120.

In step S112, by referring to the drive side pressed amount signal that has been received from the accelerator manipulation amount operation unit 10G, the acceleration suppression activation condition determination unit 34 carried out a process ("accelerator pedal manipulation amount information acquisition process" in the drawing) of acquiring the information about the pressed amount (manipulation amount) of the accelerator pedal 32. The acceleration suppression activation condition determination unit 34 carries out the process of acquiring the information about the pressed amount (manipulation amount) of the accelerator pedal 32 in step S112, and then the process to be carried out by the acceleration suppression activation condition determination unit 34 goes to step S114.

In step S114, the acceleration suppression activation condition determination unit 34 carries out a process ("accelerator pedal manipulation determination process" in the drawing) of determining whether or not the condition that the pressed amount (manipulation amount) of the accelerator pedal 32 is equal to or larger than a predefined threshold accelerator manipulation amount is satisfied. Herein, the process of step S114 is carried out based on the pressed amount of the accelerator pedal 32 acquired in step S112. It is to be noted that in the present embodiment, a case where the threshold accelerator manipulation amount is set to a manipulation amount that conforms to a suppression end condition of the acceleration suppression control of the opening degree of the accelerator pedal 32 will be described as an example. When the acceleration suppression activation condition determination unit 34 determines in step S114 that the condition where the pressed amount (manipulation amount) of the accelerator pedal 32 is equal to or larger than the threshold accelerator manipulation amount is satisfied ("Yes" in the drawing), the process to be carried out by the acceleration suppression activation condition determination unit 34 goes to step S116. On the other hand, when the acceleration suppression activation condition determination unit 34 determines in step S114 that the condition where the pressed amount (manipulation amount) of the accelerator pedal 32 is equal to or larger than the threshold accelerator manipulation amount is not satisfied ("No" in the drawing), the process to be carried out by the acceleration suppression activation condition determination unit 34 goes to step S120.

In step S116, the acceleration suppression activation condition determination unit 34 carried out a process ("parking frame entering determination information acquisition process" in the drawing) of acquiring information to determine whether or not the vehicle V enters a parking frame. Herein, in the present embodiment, a case where whether or not the vehicle V enters the parking frame is determined based on the steering angle of the steering wheel 28, an angle made by the vehicle V and the parking frame, and a distance between the vehicle V and the parking frame will be described as an example. The acceleration suppression activation condition determination unit 34 carried out the process of acquiring the information to determine whether or not the vehicle V enters a parking frame is carried out in step S116, and then the process to be carried out by the acceleration suppression activation condition determination unit 34 goes to step S118.

Herein, a specific example of the process to be carried out in step S116 will be described.

In step S116, the acceleration suppression activation condition determination unit 34 acquires the rotation angle (steering angle) of the steering wheel 28 by referring to the steering angle signal which has been received from the steering angle operation unit 10C. In addition to this, the acceleration suppression activation condition determination unit 34 acquires an angle α made by the vehicle V and a parking frame L0 and a distance D between the vehicle V and the parking frame L0 based on the bird's-eye view image of surroundings of the vehicle V included in the bird's-eye view image signal which has been received from the surrounding environment recognition information operation unit 10A.

Figure 5:
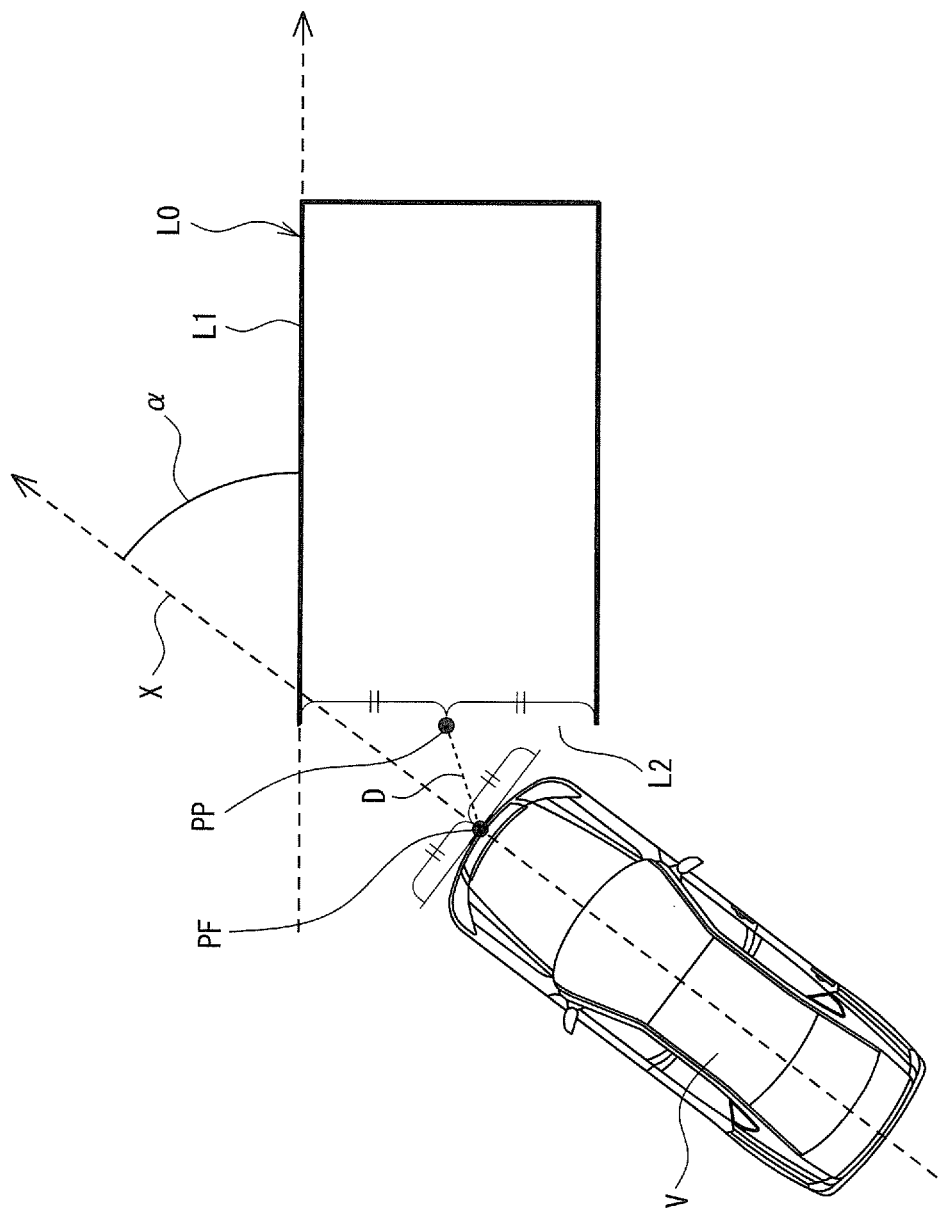
FIG. 5 is a view illustrative of a vehicle V, a parking frame L0, and a distance D between the vehicle V and the parking frame L0.

Herein, the angle α is set to an absolute value of a crossing angle made by a virtual straight line X and a frame line L1 as well as a virtual line on the parking frame L0 side, for example, as illustrated in FIG. 5. It is to be noted that FIG. 5 is a view illustrative of the vehicle V, the parking frame L0, and the distance D between the vehicle V and the parking frame L0.

In addition, the straight line X is a straight line extending in the front-rear direction of the vehicle V passing through the center of the vehicle V (a virtual straight line extending in the drive direction), and the frame line L1 is a frame line to be parallel to or substantially parallel to the front-rear direction of the vehicle V when parking in the parking frame L0 is completed.

In addition, the line on the parking frame L0 side is a virtual line on the parking frame L0 side, and is an extending line of the parking line L1. In addition, the distance D is, for example, as illustrated in FIG. 5, set to a distance between a center point PF of the front end face of the vehicle V and a center point PP of an entrance L2 of the parking frame L0. The distance D, however, takes a negative value when the front end face of the vehicle V passes through the entrance L2 of the parking frame L0. It is to be noted that the distance D may be set to zero, after the front end face of the vehicle V passes through the entrance L2 of the parking frame L0.

Herein, the location on the vehicle V side for defining the distance D is not limited to the center point PF. For example, they may be a predefined location in the vehicle V and a predefined location at the entrance L2. In this case, the distance D is a distance between the predefined location in the vehicle V and the predefined location at the entrance L2.

As described heretofore, in step S116, as the information for determining whether or not the vehicle V enters the parking frame L0, the acceleration suppression activation condition determination unit 34 acquires the steering angle, the angle α of the vehicle V and the parking frame L0, and the distance D between the vehicle V and the parking frame L0.

In step S118, the acceleration suppression activation condition determination unit 34 carries out a process ("parking frame entering determination process" in the drawing) of determining whether or not the vehicle V enters a parking frame L0 based on the information acquired in step S116. When the acceleration suppression activation condition determination unit 34 determines in step S118 that the vehicle V does not enter the parking frame L0 ("No" in the drawing), the process to be carried out by the acceleration suppression activation condition determination unit 34 goes to step S120. On the other hand, when the acceleration suppression activation condition determination unit 34 determines in step S118 that the vehicle V enters the parking frame L0 ("Yes" in the drawing), the process to be carried out by the acceleration suppression activation condition determination unit 34 goes to step S122.

Herein, a specific example of the process to be carried out in step S118 will be described.

In step S118, when all of following three conditions (A1 to A3) are satisfied, the acceleration suppression activation condition determination unit 34 determines that the vehicle V enters a parking frame L0.

Condition A1. An elapsed time that has been passed after the steering angle detected in step S116 is equal to or larger than a predefined steering angle (for example, 45 deg) is shorter than or equal to a predefined time (for example, 20 sec).

Condition A2. The angle α of the vehicle V and the parking frame L0 is smaller than or equal to a predefined angle (for example, 40 deg).

Condition A3. The distance D between the vehicle V and the parking frame L0 is shorter than or equal to a predefined distance (for example, 3 m).

Further, the process to be used for determining whether or not the vehicle V enters the parking frame L0 is not limited to the process of using the above-described plural conditions. One or more conditions from the above-described three conditions may be used for the process of determining. In addition, the process of determining whether or not the vehicle V enters the parking frame L0 may be carried out by using the speed of the vehicle V.

In step S120, the acceleration suppression activation condition determination unit 34 carries out the process ("acceleration suppression activation condition unsatisfied" in the drawing) of generating the acceleration suppression activation condition determination result signal as the information signal including a determination result that an acceleration suppression control activation condition is not satisfied. The process of generating the acceleration suppression activation condition determination result signal including the determination result that the acceleration suppression control activation condition is not satisfied is carried out in step S120, and then the process to be carried out by the acceleration suppression activation condition determination unit 34 goes to step S124.

In step S122, the acceleration suppression activation condition determination unit 34 carries out a process ("acceleration suppression activation condition satisfied" in the drawing) of generating the acceleration suppression activation condition determination result signal as an information signal including the determination result that the acceleration suppression control activation condition is satisfied. The acceleration suppression activation condition determination unit 34 carries out the process of generating the acceleration suppression activation condition determination result including the determination result that the acceleration suppression control activation condition is satisfied in step S122, and then the process to be carried out by the acceleration suppression activation condition determination unit 34 goes to step S124.

In step S124, the acceleration suppression activation condition determination unit 34 carries out a process ("acceleration suppression activation condition determination result output" in the drawing) of outputting the acceleration suppression activation condition determination result signal generated in step S120 or step S122 to the acceleration suppression instruction value operation unit 10J. The acceleration suppression activation condition determination unit 34 carries out the process of outputting the acceleration suppression activation condition determination result to the acceleration suppression instruction value operation unit 10J n step S124, the process to be carried out by the acceleration suppression activation condition determination unit 34 returns (RETURN) to the process of step S100.

Referring to FIG. 1 to FIG. 5, by using FIG. 6 and FIG. 7, a process of operating the acceleration suppression control amount by the acceleration suppression control amount operation unit 36 will be described.

Figure 6:
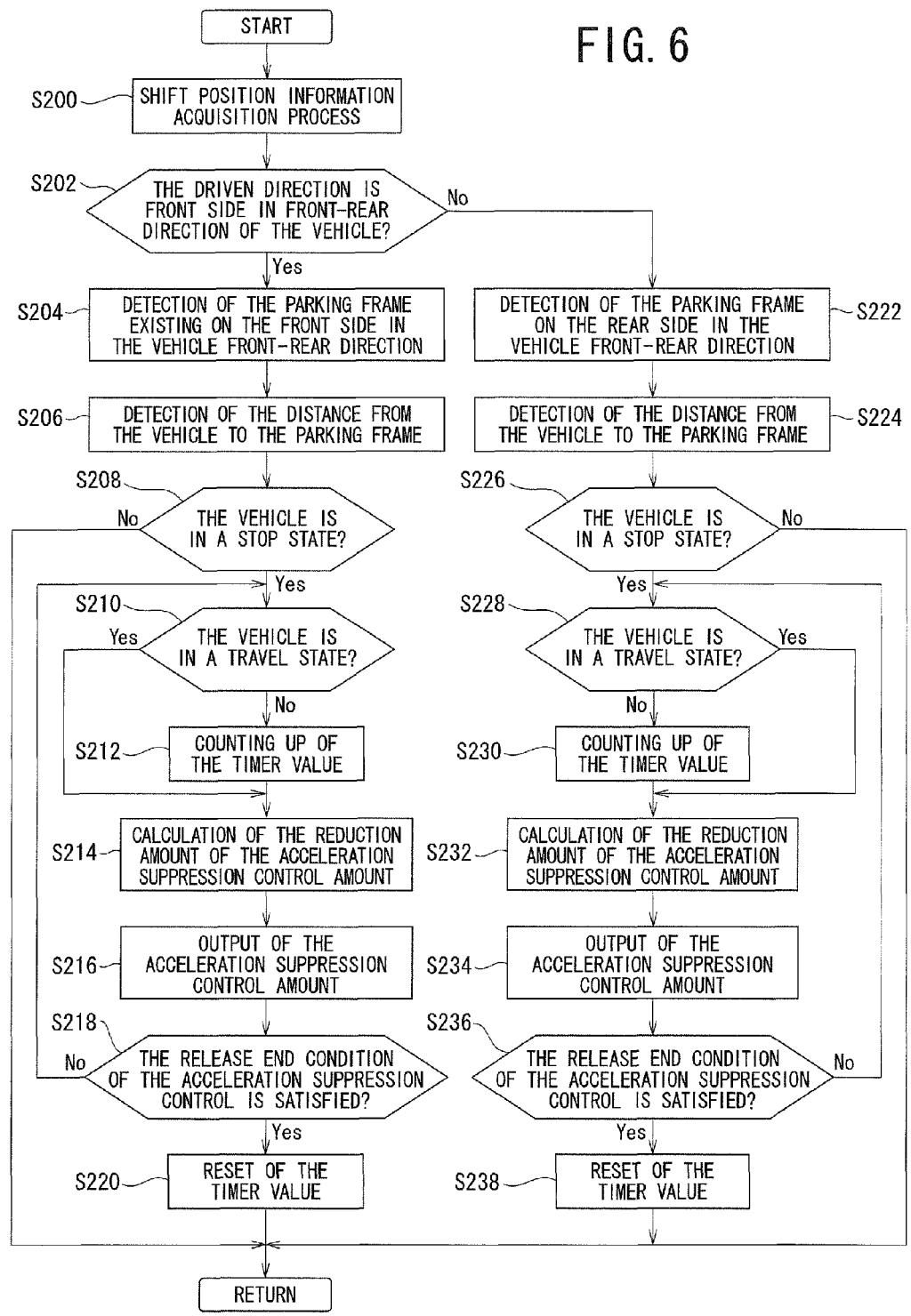
FIG. 6 is a flowchart illustrative of a process of setting an acceleration suppression control amount to be set by the acceleration suppression control amount operation unit 36.

FIG. 6 is a flowchart illustrative of a process of setting the parking frame certainty degree to be carried out by the acceleration suppression control amount operation unit 36. It is to be noted that the acceleration suppression control amount operation unit 36 is configured to carry out the process to be described below at a predefined sampling time (for example, 10 msec) while carrying out the acceleration suppression control.

As illustrated in FIG. 6, when the acceleration suppression control amount operation unit 36 starts the process (START), firstly, in step S200, the acceleration suppression control amount operation unit 36 refers to the current shift position signal that has been received from the shift position operation unit 10E, and carries out a process of ("shift position information acquisition process" illustrated in the drawing) acquiring information on the shift position ("P", "D", "R", or the like) of the vehicle V. When the acceleration suppression control amount operation unit 36 carried out the process of acquiring the information on the shift position ("P", "D", "R", or the like) of the vehicle V in step S200, the process to be carried out by the acceleration suppression control amount operation unit 36 goes to step S202.

In step S202, the acceleration suppression control amount operation unit 36 carries out a process of ("the driven direction is front side in front-rear direction of the vehicle?" illustrated in the drawing) detecting a driven direction of the vehicle V based on the shift position ("P", "D", "R", or the like) of the vehicle V acquired in step S200. To be specific, the acceleration suppression control amount operation unit 36 determines whether or not the shift position of the vehicle V is "D". Then, when determining that the shift position of the vehicle V is "D", the acceleration suppression control amount operation unit 36 detects that the driven direction of the vehicle V is the front side in front-rear direction of the vehicle ("Yes" illustrated in the drawing), and then the process goes to step S204. On the other hand, when determining that the shift position of the vehicle V is "R", the acceleration suppression control amount operation unit 36 detects that the driven direction of the vehicle V is the rear side in the front-rear direction of the vehicle ("No" illustrated in the drawing), and then the process goes to step S222.

In step S204, the acceleration suppression control amount operation unit 36 refers to the bird's-eye view image signal that has been received from the surrounding environment recognition information operation unit 10A, and acquires an image of the surrounding of the vehicle V. Subsequently, the acceleration suppression control amount operation unit 36 carries out a process ("detection of the parking frame existing on the front side in the vehicle front-rear direction" illustrated in the drawing) of detecting the parking frame L0 existing ahead in the driven direction of the vehicle V, that is on the front side in the vehicle front-rear direction based on the acquired image and the driven direction detected in step S202. When the parking frame L0 existing on the front side in the vehicle front-rear direction is detected in step S204, the process to be carried out by the acceleration suppression control amount operation unit 36 goes to step S206.

In step S206, the acceleration suppression control amount operation unit 36 carries out a process of ("the distance from the vehicle to the parking frame is detected" illustrated in the drawing) detecting the distance between the vehicle V and the parking frame L0 existing ahead in the driven direction of the vehicle V detected in step S204, that is on the front side in the front-rear direction of the vehicle V. To be specific, the acceleration suppression control amount operation unit 36 refers to the bird's-eye view image signal that has been received from the surrounding environment recognition information operation unit 10A, and acquires an image of surrounding of the vehicle V. Subsequently, the acceleration suppression control amount operation unit 36 detects a distance between the vehicle V and a left or right end of an entrance L2 of the parking frame L0 based on the acquired image and the parking frame L0 detected in step S204. In step S206, the distance between the vehicle V and the parking frame L0 on the front side in the vehicle front-rear direction is detected, and then the process to be carried out by the acceleration suppression control amount operation unit 36 goes to step S208.

It is to be noted that, in the present embodiment, the example of detecting the distance between the vehicle V and the left or right end of the entrance L2 of the parking frame L0 has been described, but another configuration may be employed. For example, a distance between the vehicle V and a left or right corner on the far side of the parking frame L0 may be detected.

In step S208, the acceleration suppression control amount operation unit 36 carries out a process of ("the vehicle is in a stop state?" illustrated in the drawing) determining whether or not the vehicle V is in a stop state based on the distance between the vehicle V and the parking frame L0 existing ahead in the driven direction of the vehicle V detected in step S206, that is on the front side in the vehicle front-rear direction. The stop state includes, for example, a state where the vehicle V is not moving in either one of the driven direction detected in step S202 or the opposite direction to the driven direction, and a state where the vehicle V is moving in the opposite direction to the driven direction detected in step S202. Then, when the acceleration suppression control amount operation unit 36 determines that the vehicle V is in the stop state ("Yes" illustrated in the drawing), the process goes to step S210. On the other hand, when the acceleration suppression control amount operation unit 36 determines that the vehicle V is not in the stop state ("No" illustrated in the drawing), the process ends the operation (RETURN).

In step S210, the acceleration suppression control amount operation unit 36 carries out a process ("the vehicle is in a travel state?") of determining whether or not the vehicle V is in a travel state based on the distance between the vehicle V and the parking frame L0 existing ahead in the driven direction of the vehicle V detected in step S206, that is on the front side in the vehicle front-rear direction. The travel state includes, for example, a state of traveling in the driven direction detected in step S202. Then, when the acceleration suppression control amount operation unit 36 determines that the vehicle V is in the travel state ("Yes" illustrated in the drawing), the process goes to step S214. On the other hand, when the acceleration suppression control amount operation unit 36 determines that the vehicle V is not in the travel state ("No" illustrated in the drawing), the process goes to step S212. Accordingly, when the acceleration suppression control amount operation unit 36 detects the travel state, the step S212 is omitted and a timer value to be described below is maintained, so that a release state of the acceleration suppression control at the time point when the travel state is detected is held.

In step S212, the acceleration suppression control amount operation unit 36 carries out a process ("counting up of the timer value" illustrated in the drawing) of adding the sampling time (10 msec) to a variable representing an elapsed time since the stop state is detected in step S208 (hereinafter, also referred to as "timer value"). It is to be noted that the acceleration suppression control amount operation unit 36 resets the timer value to "0", when the travel controller 10 is powered on. Accordingly, whenever the acceleration suppression control amount operation unit 36 determines that the vehicle V is in the stop state and carries out step S212, the acceleration suppression control amount operation unit 36 adds the sampling time (10 msec) to the timer value, and measures the elapsed time since the acceleration suppression control amount operation unit 36 detects that the vehicle V is in the stop state. In step S212, the acceleration suppression control amount operation unit 36 adds the sampling time (10 msec) to the timer value, and then the process to be carried out by the acceleration suppression control amount operation unit 36 goes to step S214.

Figure 7:
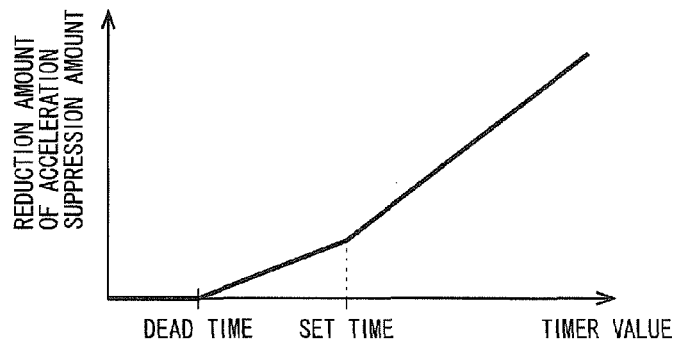
FIG. 7 is a view illustrative of an acceleration suppression control amount reducing control map.

FIG. 7 is a view illustrative of an acceleration suppression control amount reducing control map. In step S214, the acceleration suppression control amount operation unit 36 refers to the acceleration suppression control amount reducing control map illustrated in FIG. 7, and carries out a process of calculating a reduction amount of the acceleration suppression control amount ("calculation of the reduction amount of the acceleration suppression control amount" illustrated in the drawing) based on the timer value calculated in step S212. In the acceleration suppression control amount reducing control map, when the timer value is smaller than a predefined dead time (for example, 0.5 sec), the acceleration suppression control amount operation unit 36 sets the reduction amount of the acceleration suppression control amount to "0". In other words, the acceleration suppression control amount operation unit 36 starts releasing the acceleration suppression control, when the timer value that is the elapsed time since the vehicle V is in the stop state is equal to or longer than the dead time (0.5 sec). Therefore, for example, in entering the parking frame L0, the vehicle V makes a turn and stops once. Then, when the driven direction of the vehicle V is changed to move again, and if the vehicle V is in the stop state before moving again, it is possible to prevent an immediate start of releasing the acceleration suppression control. Also, in the acceleration suppression control amount reducing control map, when the timer value is equal to or longer than the predefined dead time (0.5 sec), as the timer value is larger, the reduction amount of the acceleration suppression control amount that is the release amount of the acceleration suppression control amount is set to be larger. In such a case, in the acceleration suppression control amount reducing control map, when the timer value is equal to or larger than the set time (>dead time), the reduction amount of the acceleration suppression control amount is increased with respect to an increase in the timer value, as compared to a case where the timer value is smaller than the set time. Accordingly, for example, when the vehicle V cannot move over the step and the vehicle V is in the stop state, the acceleration suppression control amount operation unit 36 increases the release amount of the acceleration suppression control until the vehicle V is in the travel state, and the acceleration suppression control is gradually released. Therefore, the acceleration instruction value depending on the pressed amount of the accelerator pedal 32 increases, and the drive force of the vehicle V increases. It is thus possible for the vehicle V to move over a step.

In step S216, the acceleration suppression control amount operation unit 36 refers to the drive side pressed amount signal that has been received from the accelerator manipulation amount operation unit 10G, and acquires information on the pressed amount (manipulation amount) of the accelerator pedal 32. Subsequently, the acceleration suppression control amount operation unit 36 generates an acceleration suppression control amount signal based on the pressed amount (manipulation amount) of the accelerator pedal 32 and the reduction amount of the acceleration suppression control amount calculated in step S214. To be specific, the acceleration suppression control amount operation unit 36 sets the acceleration suppression control amount with a subtraction result obtained by subtracting the reduction amount of the acceleration suppression control amount from a set ratio (for example, 50%) of the throttle opening degree which depends on the opening degree of the accelerator pedal 32. Subsequently, the acceleration suppression control amount operation unit 36 sets an information signal including the acceleration suppression control amount that has been operated to the acceleration suppression control amount signal. Subsequently, the acceleration suppression control amount operation unit 36 carries out a process ("output of the acceleration suppression control amount" illustrated in the drawing) of outputting a generated acceleration suppression control amount signal to the acceleration suppression instruction value operation unit 10J. In step S216, the acceleration suppression control amount operation unit 36 carries out the process of outputting the acceleration suppression control amount signal to the acceleration suppression instruction value operation unit 10J, and then the process to be carried out by the acceleration suppression control amount operation unit 36 goes to step S218.

In step S218, the acceleration suppression control amount operation unit 36 carries out a process ("the release end condition of the acceleration suppression control is satisfied?" illustrated in the drawing) of determining whether or not a release end condition of the acceleration suppression control is satisfied. As the release end condition of the acceleration suppression control, the end of the acceleration suppression control is determined, for example, when the drive side pressed amount that has been output from the accelerator manipulation amount operation unit 10G is equal to or smaller than a set value (for example, 3%), when the elapsed time measured in step S212 is equal to or longer than a set time (for example, 30 sec), or when a switch for powering on the acceleration suppression device 1 is in an off state. Then, when the acceleration suppression control amount operation unit 36 determines that the release end condition of the acceleration suppression control is satisfied ("Yes" illustrated in the drawing), the process goes to step S220. On the other hand, when the acceleration suppression control amount operation unit 36 determines that the release end condition of the acceleration suppression control is not satisfied ("No" illustrated in the drawing), the process goes to step S210.

In step S220, the acceleration suppression control amount operation unit 36 carries out a process ("reset of the timer value" illustrated in the drawing) of resetting the timer value calculated in step S212 to "0". In step S220, the acceleration suppression control amount operation unit 36 resets the timer value to "0", and then the process to be carried out by the acceleration suppression control amount operation unit 36 ends (RETURN).

On the other hand, in step S222, the acceleration suppression control amount operation unit 36 refers to the bird's-eye view image signal that has been received from the surrounding environment recognition information operation unit 10A, and acquires the image of surrounding of the vehicle V. Subsequently, the acceleration suppression control amount operation unit 36 carries out a process ("detection of the parking frame on the rear side in the vehicle front-rear direction" illustrated in the drawing) of detecting the parking frame L0 existing ahead in the driven direction front of the vehicle V that is on the rear side in the vehicle front-rear direction, based on the acquired image and the driven direction detected in step S202. In step S222, the acceleration suppression control amount operation unit 36 detects the parking frame L0 existing on the rear side in the vehicle front-rear direction, and then the process to be carried out by the acceleration suppression control amount operation unit 36 goes to step S224.

In step S224, the acceleration suppression control amount operation unit 36 carries out a process ("detection of the distance from the vehicle to the parking frame" illustrated in the drawing) of detecting the distance between the vehicle V and the parking frame L0 existing ahead in the driven direction of the vehicle detected in step S222, that is on the rear side in the vehicle front-rear direction. To be specific, the acceleration suppression control amount operation unit 36 refers to the bird's-eye view image signal that has been received from the surrounding environment recognition information operation unit 10A, and acquires the image of surrounding of the vehicle V. Subsequently, the acceleration suppression control amount operation unit 36 detects the distance between the vehicle V and a left or right end of the entrance L2 of the parking frame L0 based on the acquired image and the parking frame L0 detected in step S222. In step S224, the acceleration suppression control amount operation unit 36 detects the distance between the vehicle V and the parking frame L0 existing on the rear side in the vehicle front-rear direction, and then the process to be carried out by the acceleration suppression control amount operation unit 36 goes to step S226.

In step S226, the acceleration suppression control amount operation unit 36 carries out a process ("the vehicle is in a stop state?" illustrated in the drawing) of determining whether or not the vehicle V is in the stop state based on the distance between the vehicle V and the parking frame L0 existing ahead in the driven direction of the vehicle V detected in step S224, that is on the rear side in the vehicle front-rear direction. Then, when the acceleration suppression control amount operation unit 36 determines that the vehicle V is in the stop state ("Yes" illustrated in the drawing), the process goes to step S228. On the other hand, when the acceleration suppression control amount operation unit 36 determines that the vehicle V is not in the stop state ("No" illustrated in the drawing), the process ends the operation (RETURN).

In step S228, the acceleration suppression control amount operation unit 36 carries out a process ("the vehicle is in a travel state?" illustrated in the drawing) of determining whether or not the vehicle V is in the travel state based on the distance between the vehicle V and the parking frame L0 existing ahead in the driven direction of the vehicle V detected in step S224, that is on the rear side in the vehicle front-rear direction. Then, when the acceleration suppression control amount operation unit 36 determines that the vehicle V is in the travel state ("Yes" illustrated in the drawing), the process goes to step S232. On the other hand, when the acceleration suppression control amount operation unit 36 determines that the vehicle V is not in the travel state ("No" illustrated in the drawing), the process goes to step S230. Accordingly, when the acceleration suppression control amount operation unit 36 detects the travel state, step S230 is omitted, a timer value is maintained, and a release state of the acceleration suppression control at the time point when the travel state is detected is held.

In step S230, the acceleration suppression control amount operation unit 36 carries out a process ("timer value count up" illustrated in the drawing) of adding a sampling time (10 msec) to a variable (hereinafter, also referred to as "timer value") representing an elapsed time since the stop state is detected in step S226. It is to be noted that the acceleration suppression control amount operation unit 36 resets the timer value to "0", when the travel controller 10 is powered on. Hence, whenever the acceleration suppression control amount operation unit 36 determines that the vehicle V is in the stop state and carries out step S230, the acceleration suppression control amount operation unit 36 adds the sampling time (10 msec) to the timer value, and measures the elapsed time since the acceleration suppression control amount operation unit 36 detects that the vehicle V is in the stop state. In step S230, the process of adding the sampling time to the timer value (10 msec) is carried out, and then the process to be carried out by the acceleration suppression control amount operation unit 36 goes to step S232.

In step S232, the acceleration suppression control amount operation unit 36 refers to the acceleration suppression control amount reducing control map of FIG. 7, and carries out a process ("calculation of reduction amount of the acceleration suppression control amount" illustrated in the drawing) of calculating a reduction amount of the acceleration suppression control amount based on the timer value calculated in step S230.

In step S234, the acceleration suppression control amount operation unit 36 refers to the drive side pressed amount signal that has been received from the accelerator manipulation amount operation unit 10G, and acquires information on the pressed amount (manipulation amount) of the accelerator pedal 32. Subsequently, the acceleration suppression control amount operation unit 36 generates an acceleration suppression control amount signal based on the pressed amount (manipulation amount) of the accelerator pedal 32 and the reduction amount of the acceleration suppression control amount calculated in step S232. To be specific, the acceleration suppression control amount operation unit 36 sets the acceleration suppression control amount with a subtraction result obtained by subtracting the reduction amount of the acceleration suppression control amount from a set ratio (for example, 50%) of the throttle opening degree which depends on the opening degree of the accelerator pedal 32. Subsequently, the acceleration suppression control amount operation unit 36 sets an information signal including the acceleration suppression control amount that has been operated to the acceleration suppression control amount signal. Subsequently, the acceleration suppression control amount operation unit 36 carries out a process ("output of the acceleration suppression control amount" illustrated in the drawing) of outputting the acceleration suppression control amount signal that has been generated to the acceleration suppression instruction value operation unit 10J. In step S234, the process of outputting the acceleration suppression control amount signal to the acceleration suppression instruction value operation unit 10J is carried out, and then the process to be carried out by the acceleration suppression control amount operation unit 36 goes to step S236.

In step S236, the acceleration suppression control amount operation unit 36 carries out a process ("the release end condition of the acceleration suppression control is satisfied?" illustrated in the drawing) of determining whether or not a release end condition of the acceleration suppression control is satisfied. Then, when the acceleration suppression control amount operation unit 36 determines that the release end condition of the acceleration suppression control is satisfied ("Yes" illustrated in the drawing), the process goes to step S238. On the other hand, the acceleration suppression control amount operation unit 36 determines that the release end condition of the acceleration suppression control is not satisfied ("No" illustrated in the drawing), the process goes to step S228.

In step S238, the acceleration suppression control amount operation unit 36 carries out a process ("reset of the timer value" illustrated in the drawing) of resetting the timer value calculated in step S230 to "0". Then, the acceleration suppression control amount operation unit 36 carried out the process of resetting the timer value in step S238, and then the process to be carried out by the acceleration suppression control amount operation unit 36 comes to an end of the operation (RETURN).

(Process to be Carried Out by the Acceleration Suppression Instruction Value Operation Unit 10J)

Figure 8:
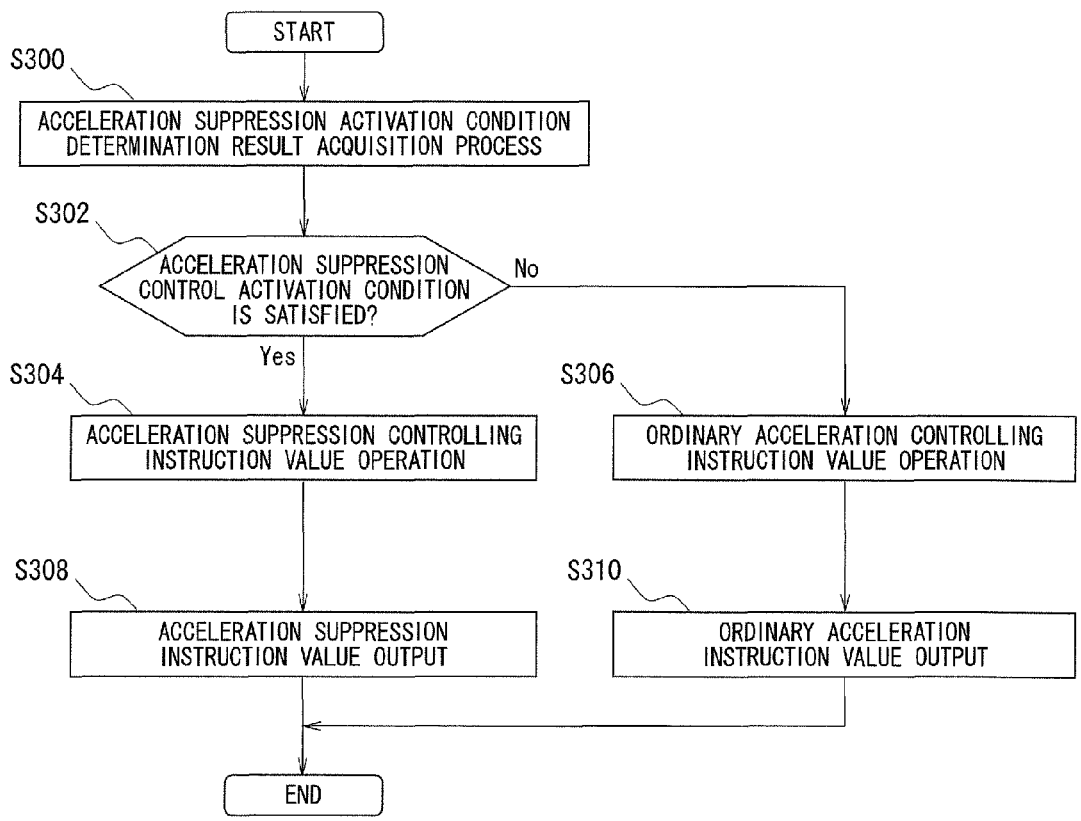
FIG. 8 is a flowchart illustrative of a process to be carried out by an acceleration suppression instruction value operation unit 10J.

Next, referring to FIG. 1 to FIG. 7, by using FIG. 8, a process to be carried out by the acceleration suppression instruction value operation unit 10J will be described. FIG. 8 is a flowchart illustrative of the process to be carried out by the acceleration suppression instruction value operation unit 10J. It is to be noted that the acceleration suppression instruction value operation unit 10J is configured to carry out the process to be described below at every predefined sampling time (for example, 10 msec).

As illustrated in FIG. 8, when the acceleration suppression instruction value operation unit 10J starts the process (START), firstly, in step S300, the acceleration suppression instruction value operation unit 10J is configured to refer to the acceleration suppression activation condition determination result signal which has been received from the acceleration suppression control content operation unit 10I. Then, the acceleration suppression instruction value operation unit 10J carries out a process ("acceleration suppression activation condition determination result acquisition process" in the drawing) of acquiring an acceleration suppression activation condition determination result. The process of acquiring the acceleration suppression activation condition determination result in step S300 is carried out, and then the process to be carried out by the acceleration suppression instruction value operation unit 10J goes to step S302.

In step S302, the acceleration suppression instruction value operation unit 10J carries out a process ("acceleration suppression control activation condition is satisfied?" in the drawing) of determining whether or not the acceleration suppression activation condition determination result acquired in step S400 is a determination result that satisfies an acceleration suppression control operation condition. In step S302, when the acceleration suppression instruction value operation unit 10J determines the determination result that satisfies an acceleration suppression control activation condition ("Yes" in the drawing), the process to be carried out by the acceleration suppression instruction value operation unit 10J goes to step S406. On the other hand, when the acceleration suppression instruction value operation unit 10J determines the determination result that does not satisfy the acceleration suppression control activation condition ("No" in the drawing) in step S302, the process to be carried out by the acceleration suppression instruction value operation unit 10J goes to step S306.

In step S304, the acceleration suppression instruction value operation unit 10J carries out a process ("acceleration suppression controlling instruction value operation" in the drawing) of operating the acceleration suppression instruction value, which is an acceleration instruction value for carrying out the acceleration suppression control. The acceleration suppression instruction value operation unit 10J carries out the process of operating the acceleration suppression instruction value is carried out in step S304, and then the process to be carried out by the acceleration suppression instruction value operation unit 10J goes to step S308. Herein, in the process of operating the acceleration suppression instruction value, the acceleration suppression instruction value operation unit 10J is configured to refer to the pressed amount of the accelerator pedal 32 included in the drive side pressed amount signal and the acceleration suppression control amount included in the acceleration suppression control amount signal. Then, the acceleration suppression instruction value operation unit 10J is configured to operate the acceleration suppression control amount instruction value to suppress the throttle opening degree with respect to the actual opening degree of the accelerator pedal 32 in a suppression level depending on the acceleration suppression control amount. Further, in the process of operating the acceleration suppression instruction value, the acceleration suppression instruction value operation unit 10J is configured to operate an instruction value including the acceleration suppression control amount instruction value that has been operated as described above, as an acceleration suppression instruction value.

In step S306, the acceleration suppression instruction value operation unit 10J carries out a process ("ordinary acceleration controlling instruction value operation" in the drawing) of operating an ordinary acceleration instruction value that is an acceleration instruction value to be used in drive force control that does not perform the acceleration suppression control, that is, the ordinary acceleration control. In step S306, the acceleration suppression instruction value operation unit 10J carries out the process of operating the ordinary acceleration instruction value, and then the process to be carried out by the acceleration suppression instruction value operation unit 10J goes to step S310. Herein, in the process of operating the ordinary acceleration instruction value, the instruction value to be operated for the throttle opening degree based on the pressed amount of the accelerator pedal 32 included in the drive side pressed amount signal is operated as an ordinary acceleration instruction value.

In step S308, the acceleration suppression instruction value operation unit 10J carries out a process ("acceleration suppression instruction value output" in the drawing) of outputting the acceleration suppression instruction value signal including the acceleration suppression instruction value operated in step S304 to the target throttle opening degree operation unit 10K. The acceleration suppression instruction value operation unit 10J carries out the process of outputting the acceleration suppression instruction value signal in step S410, the process to be carried out by the acceleration suppression instruction value operation unit 10J comes to an end (END).

In step S310, the acceleration suppression instruction value operation unit 10J carries out a process ("ordinary acceleration instruction value output" in the drawing) of outputting the ordinary acceleration instruction value signal including the ordinary acceleration instruction value operated in step S408 to the target throttle opening degree operation unit 10K. The acceleration suppression instruction value operation unit 10J carries out the process of outputting the ordinary acceleration instruction value signal in step S412, and then the process to be carried out by the acceleration suppression instruction value operation unit 10J comes to an end (END).

(Process to be Carried Out by the Target Throttle Opening Degree Operation Unit 10K)

Figure 9:
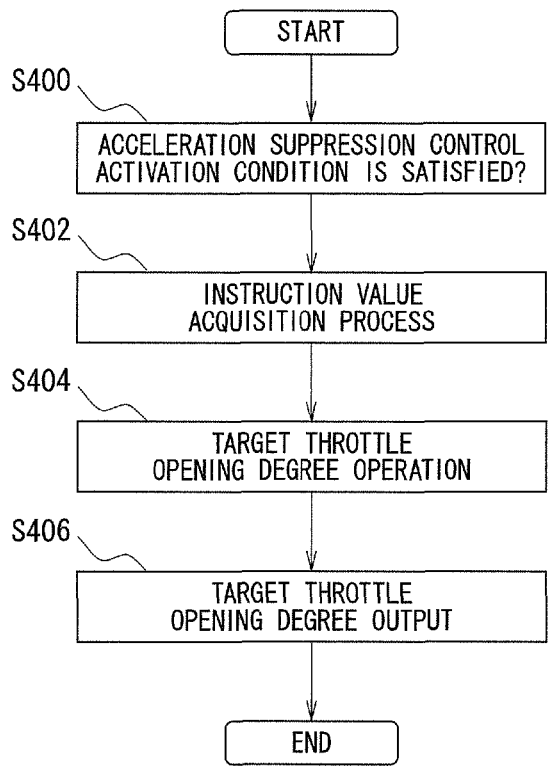
FIG. 9 is a flowchart illustrative of a process to be carried out by a target throttle opening degree operation unit 10K.

Next, referring to FIG. 1 to FIG. 8, by using FIG. 9, a process to be carried out by the target throttle opening degree operation unit 10K will be described. FIG. 9 is a flowchart illustrative of the process to be carried out by the target throttle opening degree operation unit 10K. It is to be noted that the target throttle opening degree operation unit 10K is configured to carry out the following processing at every predefined sampling time (for example, 10 msec).

As illustrated in FIG. 9, when the target throttle opening degree operation unit 10K starts (START) the process, firstly, in step S400, the target throttle opening degree operation unit 10K refers to the drive side pressed amount signal which has been received from the accelerator manipulation amount operation unit 10G. Then, the target throttle opening degree operation unit 10K carries out a process ("accelerator manipulation amount acquisition process" in the drawing) of acquiring the pressed amount (manipulation amount) of the accelerator pedal 32 included in the drive side pressed amount signal. The target throttle opening degree operation unit 10K carries out the process of acquiring the pressed amount (manipulation amount) of the accelerator pedal 32 in step S400, and then the process to be carried out by the target throttle opening degree operation unit 10K goes to step S402.

In step S402, the target throttle opening degree operation unit 10K carries out a process ("instruction value acquisition process" in the drawing) of acquiring the acceleration suppression instruction value (see step S304) or the ordinary acceleration instruction value (see step S306) based on the information signal which has been received from the acceleration suppression instruction value operation unit 10J. The target throttle opening degree operation unit 10K carries out the process of acquiring the acceleration suppression instruction value or the ordinary acceleration instruction value is carried out in step S402, and then the process to be carried out by the target throttle opening degree operation unit 10K goes to step S404.

In step S404, the target throttle opening degree operation unit 10K carries out an operation ("target throttle opening degree operation" in the drawing) of the target throttle opening degree based on the pressed amount of the accelerator pedal 32 acquired in step S400 and the instruction value acquired in step S402. The target throttle opening degree operation unit 10K operates the target throttle opening degree in step S404, and then the process to be carried out by the target throttle opening degree operation unit 10K goes to step S406. In this situation, in step S404, when the instruction value acquired in step S402 is the ordinary acceleration instruction value (when an acceleration suppression activation condition is not satisfied), the target throttle opening degree operation unit 10K operates the throttle opening degrees depending on the pressed amount of the accelerator pedal 32 as the target throttle opening degree. On the other hand, when the instruction value acquired in step S402 is the acceleration suppression instruction value (when an acceleration suppression activation condition is satisfied), the target throttle opening degree operation unit 10K operates the throttle opening degree depending on the acceleration suppression control amount instruction value as the target throttle opening degree.

For example, the target throttle opening degree is operated by using a following expression (1).

$$\theta^* = \theta 1 - \Delta\theta \qquad (1)$$

In the above expression (1), the target throttle opening degree is indicated by "$\theta^*$", the throttle opening degree depending on the pressed amount of the accelerator pedal 32 is indicated by "$\theta 1$", and the acceleration suppression control amount is indicated by "$\Delta\theta$".

In step S406, the target throttle opening degree operation unit 10K outputs the target throttle opening degree signal including the target throttle opening degree $\theta^*$ operated in step S404 to the engine controller 12 ("target throttle opening degree output" in the drawing).

The target throttle opening degree operation unit 10K carries out the process of outputting the target throttle opening degree signal to the engine controller 12 in step S406, and then the process to be carried out by the target throttle opening degree operation unit 10K comes to an end (END). In this situation, in step S406, when the instruction value acquired in step S402 is the acceleration suppression instruction value, the target throttle opening degree operation unit 10K outputs the target throttle opening degree signal at a timing when the opening degree (pressed amount) of the accelerator pedal 32 reaches the opening degree depending on the acceleration suppression control start timing.

(Operation and the Like)

Figure 10:
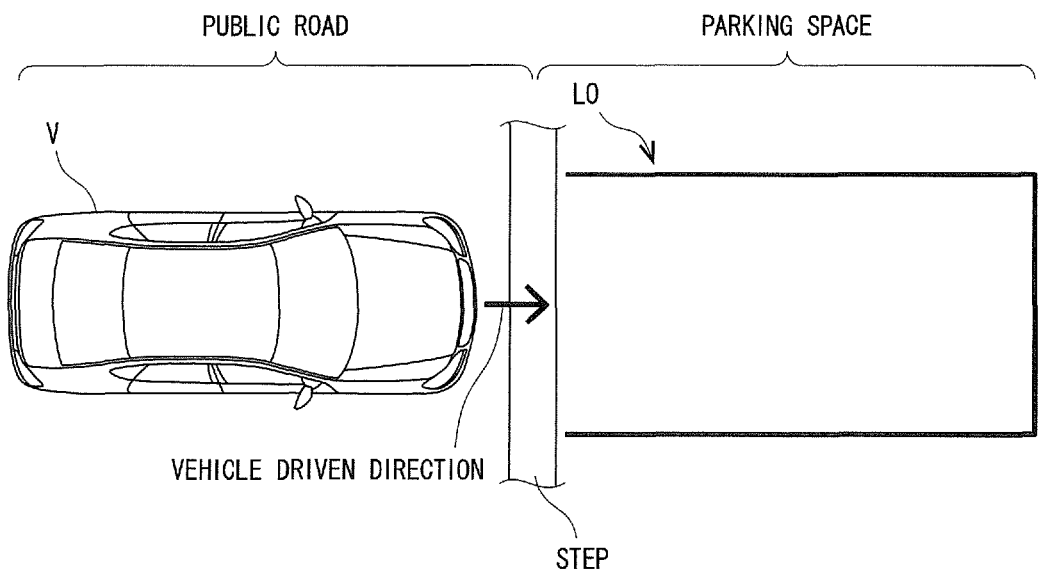
FIG. 10 is a view illustrative of an operation of the vehicle acceleration suppression device 1.

Next, while referring to FIG. 1 to FIG. 9, by using FIG. 10 to FIG. 11B, an example of the operation to be performed with the acceleration suppression device 1 in the present embodiment will be described. FIG. 10, FIG. 11A, and FIG. 11B are views illustrative of an operation of the vehicle acceleration suppression device 1.

In an example of the operation to be described below, an example that the vehicle V traveling in a parking lot enters the parking frame L0 selected by the driver will be described.

In a state where the speed of the vehicle V traveling near the parking lot is equal to or higher than a threshold vehicle speed that is 15 km/h, the acceleration suppression control activation condition is not satisfied. Hence, without activation of the acceleration suppression control in the vehicle V, the ordinary acceleration on which the driver's intended acceleration control is performed (S100, S102: "Yes", S104, S106: "No", S120, S124 in FIG. 4, S300, S302; "No", S306, S310 in FIG. 8, and S400, S402, S404, S406 in FIG. 9). When the speed becomes lower than the threshold vehicle speed, the parking frame L0 is detected, the brake pedal 30 is not manipulated, and the pressed amount of the accelerator pedal 32 is equal to or larger than a threshold accelerator manipulation amount, whether or not the vehicle V enters the parking frame L0 is determined (S106: "No", S108, S110: "No", S112, S114: "Yes", S116, S118 in FIG. 4). Then, when it is determined that the vehicle V will enter the parking frame L0, and it is determined that the acceleration suppression control activation condition is satisfied, the acceleration suppression instruction value operation unit 10J is configured to output the acceleration suppression instruction value signal to the target throttle opening degree operation unit 10K (S118: "Yes", S122, S124). Therefore, in the state where the acceleration suppression control activation condition is satisfied, when the driver manipulates the accelerator pedal 32, the throttle opening degree depending on the pressed amount of the accelerator pedal 32 is suppressed to the opening degree (50%) depending on the acceleration suppression control amount instruction value (S300, S302: "Yes", S304, S308 in FIG. 8, S400, S402, S404, S406 in FIG. 9).

Herein, as illustrated at the time point t1 of FIG. 10 to FIG. 11B, there is a step (for example, a step formed at the boundary between a parking lot and a public road) in entering the parking frame L0. It is assumed that as the throttle opening degree which depends on the pressed amount of the accelerator pedal 32 is suppressed, the vehicle V is not capable of moving over the step and the vehicle V is in the stop state. Then, the acceleration suppression control content operation unit 10I is configured to determine the driven direction of the vehicle V is on the front side in the vehicle front-rear direction based on the shift position of the vehicle V (step S200, S202: "Yes" in FIG. 6). Subsequently, the acceleration suppression control content operation unit 10I refers to the bird's-eye view image signal that has been received from the surrounding environment recognition information operation unit 10A, and acquires the image of surrounding of the vehicle V. Subsequently, the acceleration suppression control content operation unit 10I detects the parking frame L0 existing on the front side in the vehicle front-rear direction based on the acquired image and the detected driven direction (step S204 in FIG. 6). Then, the acceleration suppression control content operation unit 10I detects the distance between the vehicle V and the parking frame L0 existing on the front side in the vehicle front-rear direction (step S206 in FIG. 6). Subsequently, the acceleration suppression control content operation unit 10I determines that the vehicle V is in the stop state based on the distance between the vehicle V and the parking frame L0 existing on the front side in the vehicle front-rear direction (step S208: "Yes" in FIG. 6). Then, the acceleration suppression control content operation unit 10I determines that the vehicle V is not in the travel state based on the distance between the vehicle V and the parking frame L0 existing on the front side in the vehicle front-rear direction (step S210: "No" in FIG. 6). Subsequently, the acceleration suppression control content operation unit 10I adds the sampling time (10 msec) to the timer value (step S212 in FIG. 6). Then, the acceleration suppression control amount operation unit 36 refers to the acceleration suppression control amount reducing control map illustrated in FIG. 7, and calculates the reduction amount "0" of the acceleration suppression control amount based on the calculated timer value (step S214 in FIG. 6). Subsequently, the acceleration suppression control amount operation unit 36 generates the acceleration suppression control amount signal based on the calculated reduction amount of the acceleration suppression control amount and the drive side pressed amount signal that has been received from the accelerator manipulation amount operation unit 10G. Subsequently, the acceleration suppression control amount operation unit 36 outputs the generated acceleration suppression control amount signal to the acceleration suppression instruction value operation unit 10J (step S216 in FIG. 6). Subsequently, the acceleration suppression control amount operation unit 36 determines that the release end condition of the acceleration suppression control is not satisfied (step S218: "No" in FIG. 6). Then, the acceleration suppression control amount operation unit 36 carries out the above process flow repeatedly. As illustrated at the time point t2 of FIG. 11A and FIG. 11B, when a predefined dead time (0.5 sec) elapses, the reduction amount of the acceleration suppression control amount is increased. Accordingly, the vehicle V gradually suppresses the acceleration suppression control, the acceleration instruction value depending on the pressed amount of the accelerator pedal 32 gradually increases, and the drive force of the vehicle V gradually increases (S300, S302: "No", S306, S310 in FIG. 8, S400, S402, S404, S406 in FIG. 9). It is thus possible for the vehicle V to move over a step.

Also, as illustrated at the time point t3 of FIG. 11A and FIG. 11B, it is assumed that the vehicle V moves over a step, and the vehicle V is in the travel state, that is the speed of the vehicle V is higher than "0". Then, the acceleration suppression control amount operation unit 36 determines that the vehicle V is in the travel state based on the distance between the vehicle V and the parking frame L0 existing on the front side in the vehicle front-rear direction (step S210: "Yes" in FIG. 6). Then, the acceleration suppression control amount operation unit 36 holds a timer value, refers to the acceleration suppression control amount reducing control map illustrated in FIG. 7, and calculates the reduction amount of the acceleration suppression control (step S214 in FIG. 6). Subsequently, the acceleration suppression control amount operation unit 36 outputs the calculated acceleration suppression control amount to the acceleration suppression instruction value operation unit 10J (step S216 in FIG. 6). Accordingly, the vehicle V stops an increase in the release amount of the acceleration suppression control, the acceleration instruction value depending on the pressed amount of the accelerator pedal 32 is held, and the drive force of the vehicle V is maintained (S300, S302: "No", S306, S310 in FIG. 8, S400, S402, S404, S406 in FIG. 9). It is thus possible to prevent an increase in the acceleration instruction value of the vehicle V. Accordingly, even when there is an obstacle immediately after the vehicle V moves over a step, it is possible to move over the step more appropriately.

Further, as illustrated in FIG. 11A and FIG. 11B, it is assumed that the driver presses from the accelerator pedal 32 to the brake pedal 30, and stops the vehicle V in the parking frame L0. Then, the acceleration suppression control amount operation unit 36 determines that the release end condition of the acceleration suppression control is satisfied (step S218: "Yes" in FIG. 6). Subsequently, the acceleration suppression control amount operation unit 36 resets the timer value (step S220). Accordingly, when the vehicle V stops the release of the acceleration suppression control and the driver manipulates the accelerator pedal 32, the throttle opening degree depending on the pressed amount of the accelerator pedal 32 is controlled to 50% again (S300, S302: "Yes", S304, S308 in FIG. 8, S400, S402, S404, S406 in FIG. 9).

In the present embodiment, the travel controller 10 of FIG. 1, the acceleration suppression control content operation unit 10I of FIG. 2, the acceleration suppression activation condition determination unit 34 of FIG. 3, and step S200 of FIG. 6 configure a driven direction detector. Similarly, in the following, the travel controller 10 of FIG. 1, the acceleration suppression control content operation unit 10I of FIG. 2, the acceleration suppression activation condition determination unit 34 of FIG. 3, and steps S204 and S216 of FIG. 6 configure an ahead detector. Also, the accelerator pedal 32 of FIG. 1 configures an acceleration manipulation unit. Further, the accelerator manipulation detection sensor 24 of FIG. 1 and FIG. 2 and the accelerator manipulation amount operation unit 10G of FIG. 2 configure a manipulation amount detector. Also, the travel controller 10 of FIG. 1, the acceleration suppression instruction value operation unit 10J of FIG. 2, steps S304 and S308 of FIG. 8 configure an acceleration suppression unit. Further, the travel controller 10 of FIG. 1, the acceleration suppression control content operation unit 10I of FIG. 2, the acceleration suppression activation condition determination unit 34 of FIG. 3, and steps S208 and S226 of FIG. 6 configure a stop state detector. Also, the travel controller 10 of FIG. 1, the acceleration suppression control content operation unit 10I of FIG. 2, the acceleration suppression activation condition determination unit 34 of FIG. 3, and steps S210 and S228 of FIG. 6 configure a travel state detector. Moreover, the travel controller 10 of FIG. 1, the acceleration suppression control content operation unit 10I of FIG. 2, the acceleration suppression activation condition determination unit 34 of FIG. 3, and steps S212 and S230 of FIG. 6 configure a measurement unit.

(Effects in the Present Embodiment)

According to the present embodiment, the following effects can be brought out.

(1) The acceleration suppression control amount operation unit 36 is configured to carry out the acceleration suppression control of suppressing the acceleration instruction value (acceleration) of the vehicle V depending on the accelerator manipulation amount based on the parking frame L0 existing ahead in the driven direction of the vehicle V. Then, the acceleration suppression control amount operation unit 36 is configured to gradually release the acceleration suppression control, when detecting that the vehicle V is in the stop state while carrying out the acceleration suppression control. In addition, the acceleration suppression control amount operation unit 36 is configured to hold the release state of the acceleration suppression control at the time when the travel state is detected, when detecting that the vehicle V is in the travel state while releasing the acceleration suppression control. According to such a configuration, for example, when the vehicle enters the parking frame L0, the acceleration instruction value depending on the pressed amount of the accelerator pedal 32 is suppressed, the vehicle V is not capable of moving over a step, and the vehicle V is in the stop state, the acceleration suppression control is gradually released. Therefore, the acceleration instruction value depending on the pressed amount of the accelerator pedal 32 increases, the drive force of the vehicle V increases, and the vehicle V is capable of moving over the step. Also, for example, when the vehicle V moves over a step and the vehicle V is in the travel state, the release state of the acceleration suppression control is held, so that an increase in the acceleration instruction value can be prevented. Hence, even if there is an obstacle immediately after the vehicle moves over the step, it is possible to move over the step more appropriately.

(2) The acceleration suppression control amount operation unit 36 is configured to make larger the release amount of the acceleration suppression control, as the elapsed time from the detection of the stop state is longer, when detecting that the vehicle V is in the stop state while carrying out the acceleration suppression control. According to such a configuration, for example, when the vehicle V cannot move over the step and the vehicle V is in the stop state, the release amount of the acceleration suppression control is increased until the vehicle V is in the travel state. Therefore, the acceleration instruction value depending on the pressed amount of the accelerator pedal 32 increases, and the drive force of the vehicle V increases. It is thus possible for the vehicle V to move over the step more appropriately.

(3) The acceleration suppression control amount operation unit 36 is configured to start releasing the acceleration suppression control, when detecting that the vehicle V is in the stop state while carrying out the acceleration suppression control, and when the elapsed time since the stop state is detected is equal to or longer than a predefined dead time. According to such a configuration, for example, at the time of entering the parking frame L0, after the vehicle makes a turn and stops once, when the driven direction of the vehicle V is changed and the vehicle V starts again, it is possible to prevent a quick start of the release of the acceleration suppression control, when the vehicle is in the stop state until the vehicle starts again.

(4) When the drive side pressed amount output from the accelerator manipulation amount operation unit 10G is equal to or smaller than a set value (the release end condition of the acceleration suppression control), or when the elapsed time measured in step S212 is equal to or longer than (30 sec) or when the switch for powering on the acceleration suppression device 1 is in an off state, the acceleration suppression control amount operation unit 36 is configured to reset the timer value. According to such a configuration, for example, when the drive side pressed amount output from the accelerator manipulation amount operation unit 10G is equal to or smaller than the set value (the release end condition of the acceleration suppression control), when the elapsed time measured in step S212 is equal to or longer than (30 sec), or when the switch for powering on the acceleration suppression device 1 is in the off state, after the vehicle V mover over the step, the operation of releasing the acceleration suppression control is stopped, so that an acceleration suppression control can be restarted.

(Modification)

It is to be noted that, in the above-described embodiment, the example has been described such that the front camera 14F, the right side camera 14SR, the left side camera 14SL, and the rear camera 14R, which are configured to capture images of surroundings of the vehicle V, are used as the surrounding environment recognition sensor 14. However, another configuration can be employed. For example, an ultrasonic sensor configured to emit ultrasonic waves to the surrounding of the vehicle V and detect an obstacle (for example, a wall or the like) in the surrounding of the vehicle V may be used as the surrounding environment recognition sensor 14. In this case, the surrounding environment recognition sensor 14 is used to detect an obstacle existing ahead in the driven direction of the vehicle V, instead of the parking frame L0 ahead in the driven direction of the vehicle V. In the process to be carried out by the acceleration suppression activation condition determination unit 34, whether or not there is an obstacle in a predefined distance or region (area) with the vehicle V being set as a basis, instead of the parking frame entering determination process (step S118 in FIG. 4). Then, when it is determined that there is an obstacle, the acceleration suppression activation condition determination result signal including the determination result in which the acceleration suppression control activation condition is satisfied is output to the acceleration suppression instruction value operation unit 10J (steps S122 and S124 in FIG. 4). On the other hand, when it is determined that there is no obstacle, the acceleration suppression activation condition determination result signal including the determination result in which the acceleration suppression control activation condition is not satisfied is output to the acceleration suppression instruction value operation unit 10J (steps S120 and S124 in FIG. 4). In addition, in the process to be carried out by the acceleration suppression control amount operation unit 36, the distance between the vehicle V and the obstacle is used (step S206, S208, S210, S224, S226, S228 in FIG. 6), instead of the distance between the vehicle V and the parking frame L0.

(Effects in Modification)

According to the present modification, the following effects can be brought out.

(1) The acceleration suppression control amount operation unit 36 is configured to carry out the acceleration suppression control of suppressing the acceleration instruction value (acceleration) of the vehicle V depending on the accelerator manipulation amount based on an obstacle existing ahead in the driven direction of the vehicle V. Then, the acceleration suppression control amount operation unit 36 is configured to gradually release the acceleration suppression control, when detecting that the vehicle V is in the stop state while carrying out the acceleration suppression control. Also, the acceleration suppression control amount operation unit 36 is configured to hold the release state of the acceleration suppression control at the time when the travel state is detected, when detecting that the vehicle V is in the travel state, while releasing the acceleration suppression control.

FIG. 12 is a view illustrative of an operation of the vehicle acceleration suppression device 1. According to such a configuration, as illustrated in FIG. 12, for example, in entering the parking frame L0, when there is an obstacle such as a wall ahead in the driven direction of the vehicle V closer to the vehicle than from the parking frame L0, the acceleration instruction value depending on the pressed amount of the accelerator pedal 32 is suppressed. Then, when the vehicle cannot move over a step and is in the stop state, the acceleration suppression control is released. Accordingly, the acceleration instruction value depending on the pressed amount of the accelerator pedal 32 increases and the drive force of the vehicle V increases, so that the vehicle V can move over the step. Also, for example, when the vehicle V moves over the step and is in the travel state, the release state of the acceleration suppression control is held so that an increase in the acceleration instruction value can be prevented. Therefore, even when there is an obstacle immediately after the vehicle V moves over the step, it is possible to move over the step more appropriately.

Also, in the present embodiment, the acceleration instruction value is controlled to suppress the acceleration of the vehicle V depending on the pressed amount (drive force manipulation amount) of the accelerator pedal 32. However, the present disclosure is not limited to this. In other words, for example, the throttle opening degree depending on the pressed amount (drive force manipulation amount) of the accelerator pedal 32 is set as a target throttle opening degree, and the brake force is generated by the above-described brake device, so that the acceleration of the vehicle V depending on the drive force manipulation amount may be suppressed.

Herein, while a limited number of embodiments have been described with illustration, it should be apparent that the present disclosure is not limited to them and modifications and adaptations to each of the embodiments based on the above disclosure may occur to one skilled in the art.

The invention claimed is:

1. A vehicle acceleration suppression device, comprising:
a driven direction detector configured to detect a driven direction of a vehicle;
an ahead detector configured to detect at least one of a parking frame or an obstacle existing ahead in the driven direction of the vehicle based on the driven direction detected by the driven direction detector;
an acceleration manipulation unit configured to be manipulated by a driver of the vehicle for instructing acceleration;
a manipulation amount detector configured to detect a manipulation amount of the acceleration manipulation unit;
an acceleration suppression unit configured to carry out acceleration suppression control of suppressing the acceleration of the vehicle which depends on the manipulation amount detected by the manipulation amount detector based on the at least one of the parking frame or the obstacle existing ahead in the driven direction of the vehicle detected by the driven detection detector;
a stop state detector configured to detect that the vehicle is in a stop state; and
a travel state detector configured to detect that the vehicle is in a travel state of travelling in the driven direction of the vehicle detected by the ahead detector,
wherein the acceleration suppression unit is configured to gradually release the acceleration suppression control, when the stop state detector detects the stop state of the vehicle while carrying out the acceleration suppression control, and
wherein the acceleration suppression unit is configured to hold a release state of the acceleration suppression control at the time of detection of the travel state of the vehicle, when the travel state detector detects the travel state of the vehicle while releasing the acceleration suppression control.

2. The vehicle acceleration suppression device according to claim 1, further comprising a measurement unit configured to measure an elapsed time since the stop state detector detects the stop state,
wherein the acceleration suppression unit is configured to increase a release amount of the acceleration suppression control as the elapsed time measured by the measurement unit is longer, when the stop state detector detects the stop state of the vehicle while carrying out the acceleration suppression control.

3. The vehicle acceleration suppression device according to claim 2, wherein the acceleration suppression unit is configured to start releasing the acceleration suppression control, when the stop state detector detects the stop state of the vehicle while carrying out the acceleration suppression control, and when the elapsed time measured by the measurement unit is equal to or longer than a predefined dead time.

4. The vehicle acceleration suppression device according to claim 2, wherein the acceleration suppression unit is configured to reset the elapsed time measured by the measurement unit, when the manipulation amount detected by the manipulation amount detector is equal to or smaller than a predefined value, when the elapsed time measured by the measurement unit is equal to or longer than a set time, or when a switch for powering on the vehicle acceleration suppression device is in an off state.

5. The vehicle acceleration suppression device according to claim 3, wherein the acceleration suppression unit is configured to reset the elapsed time measured by the measurement unit, when the manipulation amount detected by the manipulation amount detector is equal to or smaller than a predefined value, when the elapsed time measured by the measurement unit is equal to or longer than a set time, or when a switch for powering on the vehicle acceleration suppression device is in an off state.

* * * * *